United States Patent [19]

Kobayashi et al.

[11] Patent Number: 6,068,794
[45] Date of Patent: May 30, 2000

[54] PROTECTIVE FILM FOR POLARIZING PLATE AND POLARIZING PLATE

[75] Inventors: Toru Kobayashi; Naoko Morita; Koichi Nagayasu, all of Hino, Japan

[73] Assignee: Konica Corporation, Japan

[21] Appl. No.: 08/783,198

[22] Filed: Jan. 14, 1997

[30] Foreign Application Priority Data

Jan. 26, 1996 [JP] Japan ................................ 8-011892

[51] Int. Cl.[7] .............................. F21V 9/14; B32B 27/38; B32B 27/00

[52] U.S. Cl. ......................... 252/585; 428/413; 428/500; 428/411.1; 428/480; 428/481; 428/532; 359/485

[58] Field of Search ........................... 252/585; 428/413, 428/500, 411.1, 480, 481, 532; 359/485, 492

[56] References Cited

U.S. PATENT DOCUMENTS 5,914,073  6/1999  Kobayashi et al. ..................... 252/585

FOREIGN PATENT DOCUMENTS 6-094915  4/1994  Japan .
6-123806  6/1994  Japan .

*Primary Examiner*—Philip Tucker
*Attorney, Agent, or Firm*—Jordan B. Bierman; Bierman, Muserlian and Lucas

[57] ABSTRACT

A protective film of a polarizing plate is disclosed in which the protective film comprising a support, and provided on one side of the support, an anti-static layer and a hardened layer in that order, the hardened layer being obtained by hardening a layer containing an ultraviolet ray hardenable resin composition with ultraviolet irradiation, wherein the antistatic layer contains a hydrophobic binder and a compound having a chemical structure represented by formula (I), (II), (III), (IV), (V), (1), (2) or (3).

8 Claims, No Drawings

PROTECTIVE FILM FOR POLARIZING PLATE AND POLARIZING PLATE

FIELD OF THE INVENTION

The present invention relates to a protective film of a polarizing plate which is used in a polarizing plate for a liquid crystal displaying device, particularly to a protective film providing excellent anti-static property, scratch resistance and adhesion property, and to a polarizing plate having a polarizing film and a protective film provided on one or each side of the polarizing film.

BACKGROUND OF THE INVENTION

In displaying devices for word processors, personal computers, TV's and gauges, an image or letter is observed through a transparent protective plate such as glass or plastic plate, which serves to protect the surface of the devices. Recently, most displaying devices are liquid crystal displaying devices. The liquid crystal displaying devices use two polarizing plates to display a liquid crystal image based on electronic signal. Generally, a polarizing plate comprises a polarizing film and a protective film provided thereon which protects the polarizing film. The polarizing film is obtained by stretching in a specific direction a polyvinyl alcohol (hereinafter referred to as PVA) film which has been applied with iodine and/or two color type dye.

The protective film of the polarizing plate referred to herein means a plastic film, which serves various functions and protects a polarizing film, provided on one or each side of the polarizing film.

Generally, the plastic film has a problem such as poor scratch resistance, antistatic property and chemical resistance. The above problem results in poor yield in the production of polarizing plates or liquid crystal displaying devices or in low reliability of products. For example, malfunction of the liquid crystal displaying device due to static electricity results in irreversible defect as products.

In Japanese Patent O.P.I. Publication No. 5-162261 is disclosed a protective film of a polarizing plate, the film providing good scratch resistance and having a layer, in which a UV hardenable resin layer is hardened, on a cellulose triacetate film as a plastic film. However, in this method, as the coating layer thickness is increased to enhance the surface hardness, it is likely to cause cracks and adhesion between the polarizing plate and the coating layer deteriorates under high temperature and high humidity, since saponification can not be conducted.

In Japanese Patent O.P.I. Publication No. 6-51122 is disclosed a method providing, on the protective film, an anti-static coating layer containing conductive fillers such as carbon black. There has been also used an anti-static coating containing an ion-complex type surfactant.

However, in the anti-static coating layer containing conductive fillers, the fillers appear as foreign matters, resulting in high haze and product value deterioration. In the antistatic layer containing an ion-complex type surfactant, the surface specific resistance is likely to vary depending on humidity, resulting in poor durability.

In Japanese Patent O.P.I. Publication No. 6-123806 are disclosed various ionic polymer compounds as anti-static agents, however, they provide insufficient scratch resistance.

Since the conventional polarizing film of the polarizing plate is poor in scratch resistance, the film is likely to be scratched and to catch (attract) foreign matter in the manufacturing process, which results in poor yield or a faulty product. Therefore, the polarizing film is covered with a temporary protective film to protect, and in the successive process, the temporary film is peeled from the polarizing film. However, this method has a problem in that when the temporary film is peeled from the polarizing film, the polarizing film attracts other foreign matter due to static electricity generation.

In the above described polarizing plate, strong adhesion between the polarizing film and the protective film are required in order to obtain high reliability and durability under various circumstances. In order to enhance this adhesion, a cellulose triacetate (hereinafter referred to as TAC) film used for a protective film, whose surface is saponified with an alkaline solution, is laminated with a polarizing film having a polyvinyl alcohol type adhesive to obtain a polarizing plate. However, since this method comprises immersion the TAC film in 5% or more sodium hydroxide solution for a long time for saponification, which is carried out employing a concentrated alkaline solution at high temperature, it is not favorable in view of manufacturing safety, environmental protection or cost. Further, the alkaline processing causes bleed-out on the TAC film surface of plasticizer or an increase of haze, resulting in a poor quality product.

In Japanese Patent O.P.I. Publication No. 6-94915 there is a description regarding adhesion between the polarizing film and the protective film in which the saponification process can be omitted by employing a hydrophilic polymer compound having strong adhesion property.

As is described above, a protective film of a polarizing plate is required to have excellent antistatic property, scratch resistance, adhesion, anti-glareness and chemical resistance. However, a polarizing film or polarizing plate having the above characteristics has not been obtained.

SUMMARY OF THE INVENTION

A first object of the invention is to provide a protective film having excellent antistatic property and scratch resistance.

A second object of the invention is to provide a protective film having excellent antistatic property and scratch resistance on one surface and having strong adhesion to a polarizing film on the other surface.

A third object of the invention is to provide a protective film, which provides low price, good yield and excellent coatability, comprising a support having an antistatic layer and a scratch resistant layer on one surface of the support and having an adhesion layer and optionally a PVA hydrophilic layer on the other surface of the support.

A fourth object of the invention is to provide a polarizing plate comprising a protective film, which comprises a support having an antistatic layer and a scratch resistant layer on one surface of the support and having an adhesion layer and optionally a PVA hydrophilic layer on the other surface of the support, and a polarizing film, wherein the protective film is laminated on one or each side of the polarizing film through the adhesion layer and optionally the PVA hydrophilic layer.

Another object of the invention will be apparent from the description below.

DETAILED DESCRIPTION OF THE INVENTION

The above object of the invention could be attained by the following constitution:

(1) A protective film for a polarizing plate, the protective film comprising a support, and provided on one side of the support, an antistatic layer containing an ionen polymer represented by formula (I), (II), (III), (IV) or (V) described later and a hydrophobic binder described later and a hardened layer on the antistatic layer wherein the hardened layer is obtained by hardening a layer containing an ultraviolet ray hardenable resin composition with ultraviolet irradiation, (2) a protective film for a polarizing plate of item (1) wherein protective film further has on the other surface of the support, an adhesion layer containing a hydrophilic polymer and optionally a PVA hydrophilic layer on the adhesion layer, (3) a polarizing plate comprising a protective film and a polarizing film, the polarizing plate comprising a support having, on one side of the support, an antistatic layer containing an ionen polymer represented by formula (I), (II), (III), (IV) or (V) described later and a hydrophobic binder described later and a hardened layer on the antistatic layer, the hardened layer being obtained by hardening a layer containing an ultraviolet ray hardenable resin composition with ultraviolet irradiation and having, on the other surface of the support, an adhesion layer containing a hydrophilic polymer and optionally a PVA hydrophilic layer on the adhesion layer, wherein the protective film is laminated on one or each side of the polarizing film through the adhesion layer and optionally the PVA hydrophilic layer, (4) a protective film for a polarizing plate, the protective film comprising a support, and provided on one side of the support, an antistatic layer containing a cationic polymer represented by formula (1) or (2) described later, which is intermolecularly cross-linked, and a hydrophobic binder described later and a hardened layer on the antistatic layer wherein the hardened layer is obtained by hardening a layer containing an ultraviolet ray hardenable resin composition with ultraviolet irradiation, (5) a protective film for a polarizing plate, the protective film comprising a support not saponificated having, on one side of the support, an antistatic layer and having, on the other surface of the support, an adhesion layer containing a hydrophilic polymer described later and optionally a PVA hydrophilic layer on the adhesion layer, (6) a polarizing plate comprising a protective film, which comprises a support having, on one side of the support, an antistatic layer containing a cationic polymer represented by formula (1) or (2) described later, which is intermolecularly cross-linked, and a hardened layer on the antistatic layer wherein the hardened layer is obtained by hardening a layer containing an ultraviolet ray hardenable resin composition with ultraviolet irradiation and having, on the other surface of the support, an adhesion layer containing a hydrophilic polymer described later and optionally a PVA hydrophilic layer on the adhesion layer, or (7) a polarizing plate comprising a protective film and a polarizing film, the polarizing plate comprising a support having, on one side of the support, an antistatic layer containing a cationic polymer represented by formula (1) or (2) described later, which is intermolecularly cross-linked, and a hardened layer on the antistatic layer, the hardened layer being obtained by hardening a layer containing an ultraviolet ray hardenable resin composition with ultraviolet irradiation, and having, on the other surface of the support, an adhesion layer containing a hydrophilic polymer and a PVA hydrophilic layer on the adhesion layer, wherein the protective film is laminated on one or each side of the polarizing film through the adhesion layer and optionally the PVA hydrophilic layer.

The present invention will be explained below.

[Support]

The support used in the invention is preferably a polyester film, a polyethylene film, polypropylene film, cellophane, a diacetylcellulose film, a TAC film, a acetylcellulose butyrate film, a polyvinylidene chloride film, a polyvinyl alcohol film, an ethylene-vinyl alcohol film, a syndiotactic polystyrene film, a polycarbonate film, a polymethylpentene film, a norbornene resin film, a polymethylpentene film, a polyetherketone film, a polyethersulfone film, a polysulfone film, a polyetherketoneimide film, a polyimide film, a fluorine-containing resin film, a nylon film, an acryl film, or a polyarylate film, in view of high transparency, excellent mechanical property and no optical anisotropy. The triacetylcellulose (cellulose triacetate) film or polycarbonate film is especially preferably used in view of excellent processability.

The support has a thickness of preferably 20 to 150 $\mu$m, and more preferably 30 to 100 $\mu$m. The support is preferably a transparent film. The transparent film herein referred to means a film having a transmittance of 70% or more at a wavelength of 500 nm when the film is measured by a spectrophotometer U-3000 produced by Hitachi Seisakusho Co., Ltd.

A TAC film is manufactured by dissolving TAC flakes and a plasticizer to obtain a viscous solution, casting the solution from an extruder on a rotating endless metal (such as stainless steel) belt to obtain a film, drying and peeling the film in wet state from the belt, further drying both surfaces of the film through transporting rollers and winding up the dried film around a core. The same manufacturing method as above applies to another support film.

The film wound up around the core is subjected to coating such as anti-static coating in the successive coating step. The present inventors have found that continuously coating is preferable in which various coating solutions are continuously coated whereby the yield is high, cost is reduced, the resulting product has no scratches, adhesion between the films or between the film and the coating layer is excellent and cost is decreased. Further, the present inventors have found that a process which a support making step connects coating steps, so-called "in-line coating" is more preferable in that the yield and adhesion are more excellent and cost is more reduced. Accordingly, when many coating steps are carried out, continuous coating is superior to discontinuous coating, and in-line coating is superior to continuous coating.

The plasticizer includes triphenyl phosphate, biphenyldiphenyl phosphate, dimethylethyl phosphate or ethylphthalylethyl glycolate. The plasticizer is an important agent to provide water resistance of a TAC film, but the less its added amount of the support is, the more preferable. Although the plasticizer is not necessary in the PC film, but the PC film may contain the plasticizer.

The support preferably contains a UV absorbent in that a protective film for a polarizing plate having an excellent light fastness is obtained. The UV absorbent used in the invention includes a salicylic acid derivative (UV-1), a benzophenone derivative (UV-2), a benzotriazole derivative (UV-3), an acrylonitrile derivative (UV-4), a benzoic acid derivative (UV-5) and an organic metal complex derivative (UV-5). The (UV-1) includes phenyl salicylate and 4-tert-butylphenyl salicylate. The (UV-2) includes 2,4-dihydroxy benzophenone and 2-hydroxy-4-methoxybenzophenone. The (UV-3) includes 2-(2'-hydroxy-5'-methylphenyl) benzotriazole and 2-(2'-hydroxy-3',5'-di-tert-butylphenyl)-

5-chlorobenzotriazole. The (UV-4) includes 2-ethylhexyl-2-cyano-3,3'-diphenylacrylate, and methyl-α-cyano-β-(p-methoxyphenyl)acrylate. The (UV-5) includes resorcinol monobenzoate and 2',4'-di-tert-butylphenyl-3,5-di-tert-butyl-4-hydroxybenzoate. The (UV-6) includes nickel bis-octylphenyl sulfamide and ethyl-3,5-di-tert-butyl-4-hydroxybenzyl phosphoric acid nickel complex.

[Anti-static layer]

The conductive polymer in the invention is an ionen polymer having a chemical structure represented by the following formula (I), (II), (III), (IV) or (V), or a cationic polymer having a chemical structure represented by the following formula (1), (2) or (3), which contains a quaternary ammonium group and is intermolecularly cross-linked.

<Ionen conductive polymer>

The ionen polymer in the invention has a chemical structure represented by the following formula (I), (II), (III), (IV) or (V):

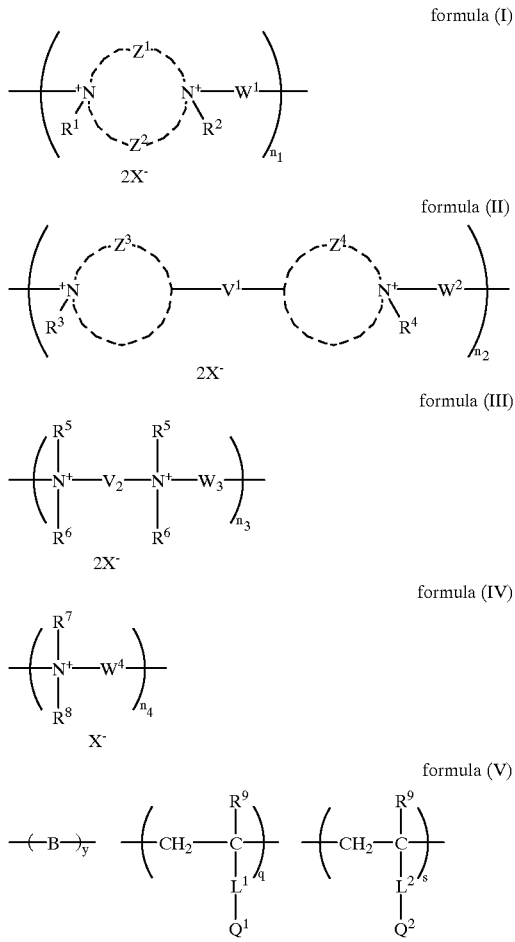

In formula (I), $Z^1$ and $Z^2$ independently represent an alkyl group having 1 to 7 carbon atoms or an alkenyl group; $R^1$ and $R^2$ independently represent an alkyl group having 1 to 10 carbon atoms, an alkenyl group, an aralkyl group or an aryl group, provided that $Z^1$, $Z^2$, $R^1$ and $R^2$ may have an alkyl group, a cycloalkyl group, a hydroxy alkyl group or an alkenyl group as a substituent and $R^1$ and $R^2$ may combine with each other to form a ring.

In formula (II), $Z^3$ and $Z^4$ independently represent an atomic group necessary to form a heterocyclic ring having 3 to 10 carbon atoms; $R^3$ and $R^4$ independently represent an alkyl group having 1 to 10 carbon atoms, an alkenyl group, an aralkyl group or an aryl group, each of which may have an alkyl group or a hydroxy alkyl group as a substituent, provided that when $Z^3$ forms an aromatic ring, $R^3$ is not present and when $Z^4$ forms an aromatic ring, $R^4$ is not present; $V^1$ represents a single bond or a divalent group such as an alkylene, alkenylene or aralkylene group.

In formula (III), $R^5$ and $R^6$ independently represent an alkyl group having 1 to 10 carbon atoms, a cycloalkyl group, a hydroxyalkyl group, an alkenyl group, an aralkyl group or an aryl group, each of which may have an alkyl group having 1 to 10 carbon atoms, a cycloalkyl group, a hydroxy alkyl group or an alkenyl group as a substituent, $V^2$ represents an alkylene, alkenylene or aralkylene group.

In formula (IV), $R^7$ and $R^8$ independently represent an alkyl group having 1 to 10 carbon atoms, an alkenyl group, an aralkyl group or an aryl group, each of which may have an alkyl group or a hydroxy alkyl group as a substituent.

In formula (V), B represents a monomer unit given by copolymerizing a monomer having an ethylenically unsaturated bond; $R^9$ represents a hydrogen atom or a methyl group, provided that the two $R^9$ may be the same or different; $L^1$ and $L^2$ independently represent a divalent linkage group; $Q^1$ represents a group having at least one quaternary ammonium group; $Q^2$ represents a group having at least one quaternary ammonium group; y represents 0 to 90 mol %; q represents 0 to 99 mol %; s represents 0 to 50 mol %, provided that y+s is not 100 and y+q+s is 100. The example of the divalent linkage group represented by $L^1$ or $L^2$ is the same as those represented by $L_1$ or $L_2$ described later.

In formula (V), $Q^1$ is represented by the following formula (VI), (VII), (VIII) or (IX):

In formula (VI), $Z^5$ and $Z^6$ independently represent an alkylene group having 1 to 7 carbon atoms or an alkenylene group; $R^{10}$ and $R^{11}$ independently represent an alkyl group having 1 to 10 carbon atoms, an alkenyl group, an aralkyl group or an aryl group, provided that $Z^5$, $Z^6$, $R^{10}$ and $R^{11}$ may have an alkyl group, a cycloalkyl group, a hydroxy alkyl group or an alkenyl group as a substituent and $R^{10}$ and $R^{11}$ may combine with each other to form a ring; and $T^1$ is represented by formula (X) or (X') described later in which M represents an alkyl group having 1 to 10 carbon atoms, an alkenyl group, an aralkyl group or an aryl group.

In formula (VII), $Z^7$ and $Z^8$ independently represent an atomic group necessary to form a heterocyclic ring having 3 to 10 carbon atoms; $R^{12}$ and $R^{13}$ independently represent an alkyl group having 1 to 10 carbon atoms, an alkenyl group, an aralkyl group or an aryl group, each of which may have an alkyl group or a hydroxy alkyl group as a substituent, provided that when $Z^7$ forms an aromatic ring, $R^{12}$ is not present and when $Z^8$ forms an aromatic ring, $R^{13}$ is not present; $V^3$ represents a single bond or a divalent group such as an alkylene, alkenylene or aralkylene group; and $T^2$ is represented by formula (XI) or (XI') described later in which M represents an alkyl group having 1 to 10 carbon atoms, an alkenyl group, an aralkyl group or an aryl group.

In formula (VIII), $R^{14}$ and $R^{15}$ independently represent an alkyl group having 1 to 10 carbon atoms, a cycloalkyl group, a hydroxyalkyl group, an alkenyl group, an aralkyl group or an aryl group, each of which may have an alkyl group having 1 to 10 carbon atoms, a cycloalkyl group, a hydroxy alkyl group or an alkenyl group as a substituent; $V^4$ represents an alkylene, alkenylene or aralkylene group; and $T^3$ is represented by formula (XII) or (XII') described later in which M represents an alkyl group having 1 to 10 carbon atoms, an alkenyl group, a benzyl group or an aryl group.

In formula (IX), $R^{16}$ and $R^{17}$ independently represent an alkyl group having 1 to 10 carbon atoms, an alkenyl group, an aralkyl group or an aryl group, each of which may have an alkyl group or a hydroxy alkyl group as a substituent; and $T^4$ is represented by formula (XIII) or (XIII') described later in which M represents an alkyl group having 1 to 10 carbon atoms, an alkenyl group, an aralkyl group or an aryl group.

In formulae (I) to (IX), X represents an anion; each $n_1$ to $n_8$ represents an integer of 1 to 100, preferably 1 to 70 and more preferably 3 to 60, $W^1$ to $W^8$ represent a divalent group, preferably independently represent an alkylene group having 1 to 10 carbon atoms, an alkenylene group or an aralkylene group. X preferably represents Cl⁻, Br⁻, I⁻, $CH_3SO_4^-$ or

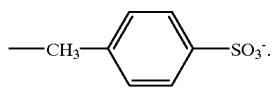

$T^1$ represents the following formula (X) or (X'), $T^2$ represents the following formula (XI) or (XI'), $T^3$ represents the following formula (XII) or (XII'), $T^4$ represents the following formula (XIII) or (XIII'), or $T^1$, $T^2$, $T^3$ and $T^4$ also independently represent a hydroxy group or a halogen atom which occurs when the polymer end is hydrolyzed or is not reacted in the ionen polymer synthetic process. The hydroxy group or halogen atom content of $T^1$, $T^2$, $T^3$ or $T^4$ may be 0 to 5 mol %, but preferably is 0. The ionen polymer can be prepared so that $T^1$, $T^2$, $T^3$ or $T^4$ contains neither hydroxy group nor halogen atom.

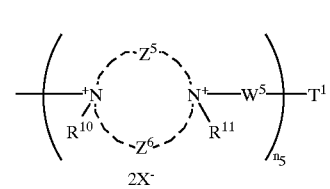

formula (VI)

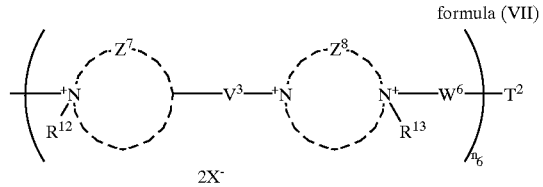

formula (VII)

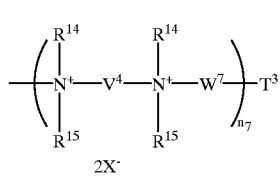

formula (VIII)

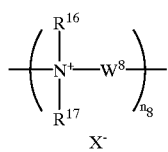

formula (IX)

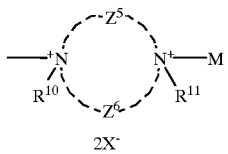

formula (X)

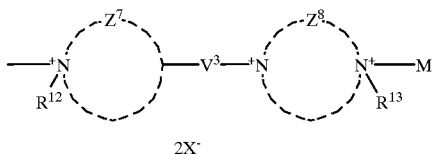

formula (XI)

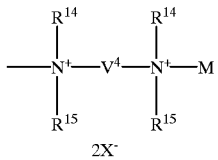

formula (XII)

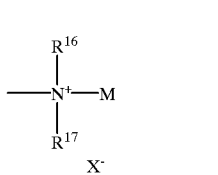

formula (XIII)

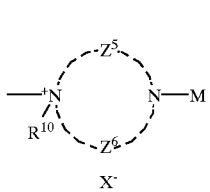

formula (X')

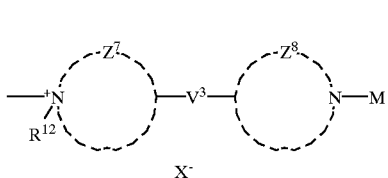

formula (XI')

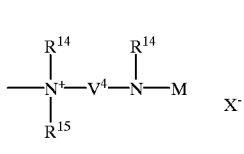

formula (XII')

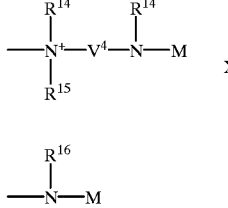

formula (XIII')

In formula (V), $L^2$ represents a divalent linkage group; $Q^2$ represents a group having at least one quaternary ammonium group which is represented by formula (X), (X'), (XI), (XI'), (XII), (XII'), (XIII) or (XIII') above or the following formula (XIV). In formula (XIV), D represents an atomic group necessary to form a 5- or 6-membered saturated or unsaturated heterocyclic ring having 1 to 12 carbon atoms; and M represents an alkyl group having 1 to 10 carbon atoms, an alkenyl group, an aralkyl group or an aryl group.

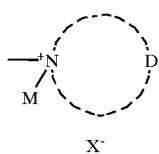

formula (XIV)

<Quaternary ammonium group containing cationic polymer which is intermolecularly cross-linked>

The quaternary ammonium group containing cationic polymer in the invention which is intermolecularly cross-linked has a chemical structure represented by the following formula (1), (2) or (3):

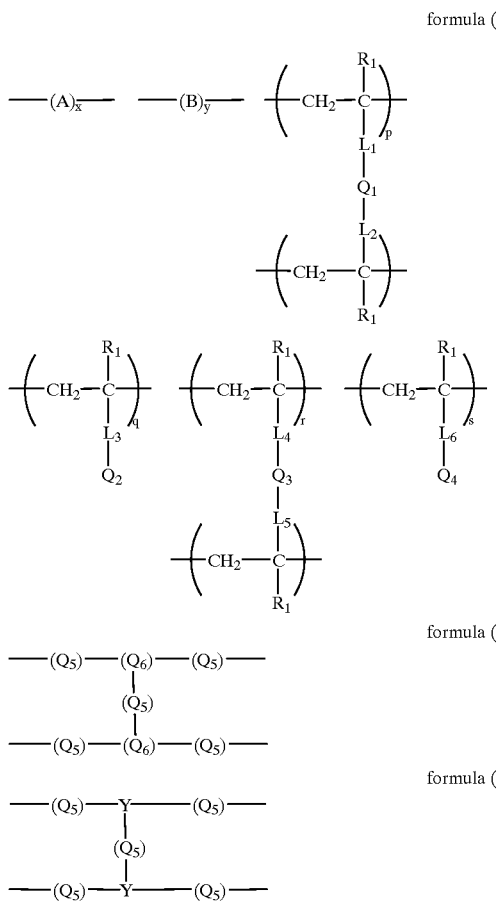

In formula (1), A represents a monomer unit given by copolymerizing a monomer having at least two ethylenically unsaturated bonds; B represents a monomer unit given by copolymerizing a monomer having an ethylenically unsaturated bond; $R_1$ represents a hydrogen atom or a methyl group, provided that the two $R_1$ may be the same or different; $L_1$, $L_2$, $L_3$, $L_4$, $L_5$ and $L_6$ independently represent a divalent linkage group; $Q_1$ and $Q_3$ independently represent a divalent linkage group having at least one quaternary ammonium group; $Q_2$ and $Q_4$ independently represent a group having at least one quaternary ammonium group; x represents 0 to 80 mol %; y represents 0 to 90 mol %; p represents 0 to 100 mol %; q represents 0 to 99 mol %; r represents 0 to 100 mol %; s represents 0 to 50 mol %, provided that x+y is not 100, y+q is not 100, y+s is not 100, q+s is not 100, y+q+s is not 100 and x+y+p+q+r+s is 100.

In formulae (2) and (3), $Q_5$ represents a divalent linkage group having at least one quaternary ammonium group; $Q_6$ represents a trivalent linkage group having at least one quaternary ammonium group; and Y represents a trivalent linkage group having no quaternary ammonium group.

In formula (1), $R_1$ represents a hydrogen atom or a methyl group, provided that the two $R_1$ may be the same or different.

For example, $L_1$, $L_2$, $L_3$, $L_4$, $L_5$ and $L_6$ independently represent a divalent linkage group represented by the following:

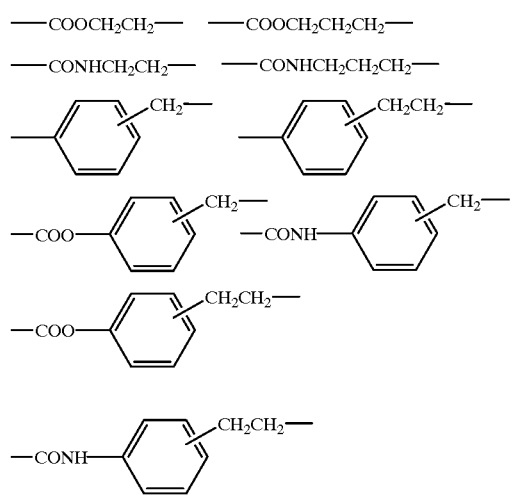

$Q_1$ and $Q_3$ in formula (1) and $Q_5$ in formula (2) and (3) each represents a divalent linkage group represented by the following formula (4), (5), (6) or (7); and $Q_2$ and $Q_4$ represent a group represented by the following formula (4'), (5'), (6') or (7'):

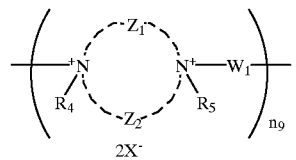

formula (4)

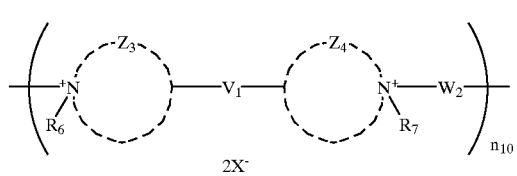

formula (5)

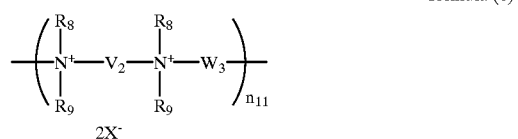

formula (6)

-continued

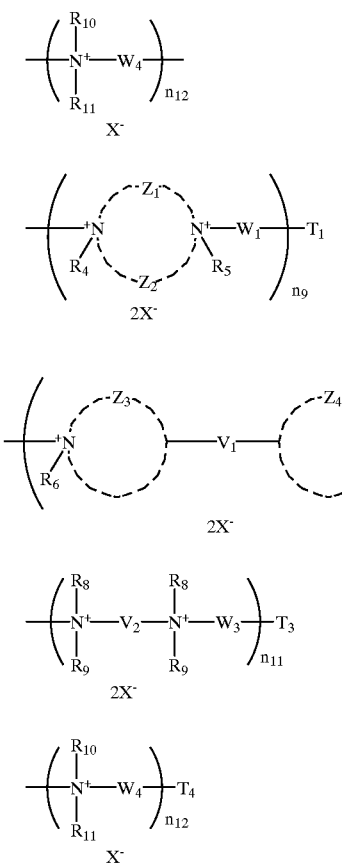

In formula (4) or (4'), $Z_1$ and $Z_2$ independently represent an alkylene group having 1 to 7 carbon atoms or an alkenylene group; $R_4$ and $R_5$ independently represent an alkyl group having 1 to 10 carbon atoms, an alkenyl group, an aralkyl group or an aryl group, provided that $Z_1$, $Z_2$, $R_4$ and $R_5$ may have an alkyl group, a cycloalkyl group, a hydroxy alkyl group or an alkenyl group as a substituent and $R_4$ and $R_5$ may combine with each other to form a ring; $T_1$ is represented by formula (8) or (8') described later in which $Z_5$ and $Z_6$ independently represent an alkylene group having 1 to 7 carbon atoms; $R_{12}$ and $R_{13}$ independently represent an alkyl group having 1 to 10 carbon atoms, an alkenyl group, a benzyl group or an aryl group, provided that $Z_5$, $Z_6$, $R_{12}$ and $R_{13}$ may have an alkyl group, a cycloalkyl group, a hydroxyalkyl group or an alkenyl group as a substituent and $R_{12}$ and $R_{13}$ may combine with each other to form a ring.

In formula (5) or (5'), $Z_3$ and $Z_4$ independently represent an atomic group necessary to form a heterocyclic ring having 3 to 10 carbon atoms; $R_6$ and $R_7$ independently represent an alkyl group having 1 to 10 carbon atoms, an alkenyl group, an aralkyl group or an aryl group, each of which may have an alkyl group or a hydroxyalkyl group as a substituent, provided that when $Z_3$ forms an aromatic ring, $R_6$ is not present and when $Z_4$ forms an aromatic ring, $R_7$ is not present; $V_1$ represents a single bond or a divalent group such as an alkylene, alkenylene or aralkylene group; and $T_2$ is represented by formula (9) or (9') described later, in which $Z_7$ and $Z_8$ independently represent an atomic group necessary to form a heterocyclic ring having 3 to 10 carbon atoms, $R_{14}$ and $R_{15}$ independently represent an alkyl group having 1 to 10 carbon atoms, an alkenyl group, an aralkyl group or an aryl group, each of which may have an alkyl group or a hydroxy alkyl group as a substituent, provided that when $Z_7$ forms an aromatic ring, $R_{14}$ is not present and when $Z_8$ forms an aromatic ring, $R_{15}$ is not present; $V_3$ represents a single bond or a divalent group such as an alkylene, alkenylene or aralkylene group.

In formula (6) or (6'), $R_8$ and $R_9$ independently represent an alkyl group having 1 to 10 carbon atoms, a cycloalkyl group, a hydroxyalkyl group, an alkenyl group, an aralkyl group or an aryl group, each of which may have an alkyl group having 1 to 10 carbon atoms, a cycloalkyl group, a hydroxy alkyl group or an alkenyl group as a substituent; $V_2$ represents an alkylene, alkenylene or aralkylene group; and $T_3$ is represented by formula (10) or (10') described later in which $R_{16}$ and $R_{17}$ independently represent an alkyl group having 1 to 10 carbon atoms, a cycloalkyl group, a hydroxyalkyl group, an alkenyl group, a benzyl group or an aryl group, each of which may have an alkyl group having 1 to 10 carbon atoms, a cycloalkyl group, a hydroxyalkyl group or an alkenyl group as a substituent, $V_4$ represents a divalent group such as an alkylene, alkenylene or aralkylene group.

In formula (7) or (7'), $R_{10}$ and $R_{11}$ independently represent an alkyl group having 1 to 10 carbon atoms, an alkenyl group, an aralkyl group or an aryl group, each of which may have an alkyl group or a hydroxy alkyl group as a substituent; and $T_4$ is represented by formula (11) or (11') described later in which $R_{18}$ and $R_{19}$ independently represent an alkyl group having 1 to 10 carbon atoms, an alkenyl group, an aralkyl group or an aryl group, each of which may have an alkyl group or a hydroxy alkyl group as a substituent.

M in each of formulae (8) through (11) and (8') through (11') represents an alkyl group having 1 to 10 carbon atoms, an alkenyl group, an aralkyl group or an aryl group; X in each of formulae (4) through (7) and (4') through (11') represents an anion, for example, Cl⁻, Br⁻, I⁻, $CH_3SO_4^-$ or $p\text{-}CH_3C_6H_5SO_3^-$; $n_9$ in formulae (4) and (4'), $n_{10}$ in formulae (5) and (5'), $n_{11}$ in formulae (6) and (6') and $n_{12}$ in formulae (7) and (7') independently represent an integer of 1 to 100, preferably 1 to 70 and more preferably 3 to 60; and $W_1$ in formulae (4) and (4'), $W_2$ in formulae (5) and (5'), $W_3$ in formulae (6) and (6') and $W_4$ in formulae (7) and (7') independently represent a divalent group, preferably, $W_1$, $W_2$, $W_3$ and $W_4$ independently represent an alkylene group having 1 to 10 carbon atoms, an alkenylene group or an aralkylene group.

$T_1$, $T_2$, $T_3$ and $T_4$ represent formula (8) or (8'), (9) or (9'), (10) or (10') and (11) or (11'), respectively, or $T_1$, $T_2$, $T_3$ and $T_4$ also independently represent a hydroxy group or a halogen atom which occurs when the polymer end is hydrolyzed or is not reacted in the cationic polymer synthetic process. The hydroxy group or halogen atom content of $T_1$, $T_2$, $T_3$ and $T_4$ may be 0 to 5 mol %, but preferably is 0. The ionen polymer can be prepared so that $T_1$, $T_2$, $T_3$ or $T_4$ contains neither hydroxy group nor halogen atom.

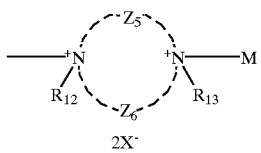

formula (8)

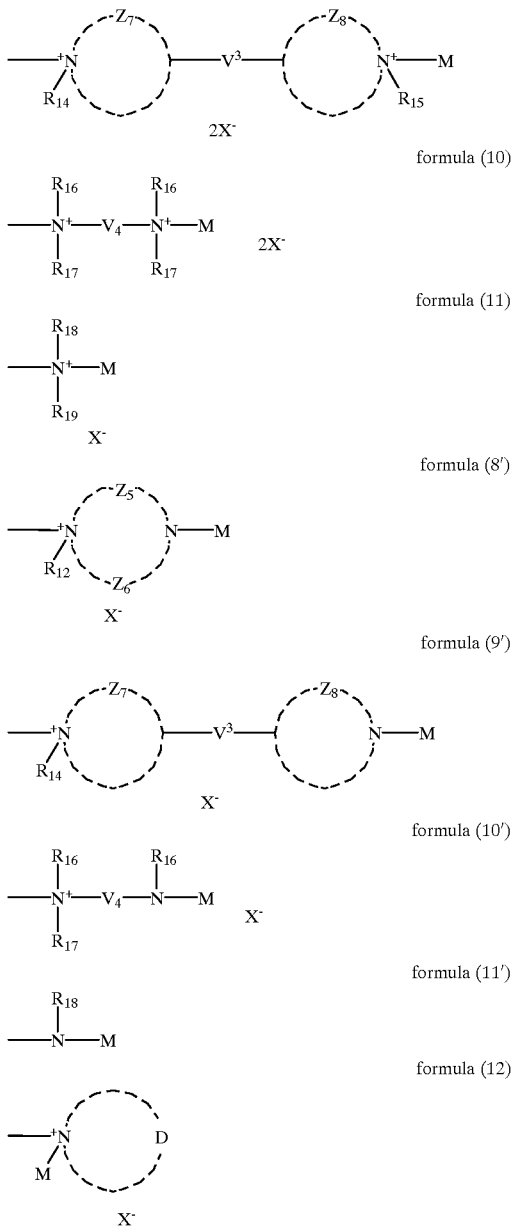

formula (9)

formula (10)

formula (11)

formula (8')

formula (9')

formula (10')

formula (11')

formula (12)

In formula (12), D represents an atomic group necessary to form a 5- or 6-membered saturated or unsaturated heterocyclic ring having 1 to 12 carbon atoms; and M represents an alkyl group having 1 to 10 carbon atoms, an alkenyl group, an aralkyl group or an aryl group.

In formula (2), $Q_6$ represents a trivalent linkage group or a quarternary ammonium group containing group represented by the following formula:

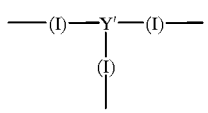

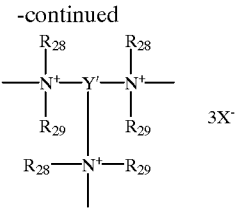

wherein Y' represents the same as Y denoted in formula (3), which represents a trivalent linkage group; I represents an ionen polymer chain represented by formula (4), (5), (6) or (7); and $R_{28}$ and $R_{29}$ independently represent an alkyl group having 1 to 10 carbon atoms, an alkenyl group, an aralkyl group or an aryl group, each of which may have an alkyl group or a hydroxy alkyl group as a substituent.

Next, synthesis of the above cationic conductive polymer will be detailed. The synthetic method of a compound represented by formula (I), (II), (III), (IV) or (V) is described below.

(a) The compound represented by formula (I), (II), (III) or (IV) is prepared by reacting a compound having two tertiary amino groups with a compound having two alkylating groups or two aralkylating groups to polymerize while quaternizing.

(b) The compound represented by formula (IV) is prepared by reacting a compound having a secondary amine with a compound having two alkylating groups or two aralkylating groups to obtain a compound having two tertiary amino groups and then quaternizing this compound with a compound having two alkylating groups or two aralkylating groups to obtain an ionen polymer.

(c) The compound represented by formula (V) is prepared by a method comprising the steps of polymerizing an ethylenically unsaturated monomer represented by the following formula (XV), which is capable of being quaternized on reaction with a tertiary amine, or optionally copolymerizing the monomer with another copolymerizable monomer to obtain a polymer and then reacting the polymer with the tertiary amine (including an ionen polymer) to quaternize.

formula (XV)

$$CH_2=CR-L-G$$

wherein R represents a hydrogen atom or a methyl group, L represents a divalent group; and G represents a group capable of reacting with a tertiary amine.

When a tertiary amine having two or more nitrogen atoms, an unreacted end tertiary amino group is quaternized with an alkylating agent or an aralkylating agent to stabilize.

(d) The compound represented by formula (V) is prepared by a method comprising the steps of reacting an ethylenically unsaturated monomer represented by formula (XV), which is capable of being quaternized on reaction with a tertiary amine, with a tertiary amine compound (including an ionen polymer) to obtain an ethylenically unsaturated monomer having a quaternary ammonium group represented by the following formula (XVI) and then polymerizing the formula (XVI) monomer:

formula (XVI)

$$CH_2=CR-L-Q^{+n}X^{-n}$$

wherein R represents a hydrogen atom or a methyl group; L represents a divalent group; $Q^{+n}$ represents a group containing one or more quaternary ammonium groups which shows $Q^1$ or $Q^2$ in formula (V); and $X^{-n}$ represents a counter anion of the ammonium group.

The synthetic method of the formula (1) compound is as follows:

i) An ethylenically unsaturated monomer is polymerized and is quaternized with a tertiary amine. In the same manner as (c) above, the method comprises the steps of polymerizing an ethylenically unsaturated monomer represented by the following formula (17), which is capable of being quaternized on reaction with a tertiary amine, or optionally copolymerizing the monomer with another copolymerizable monomer to obtain a polymer and then reacting the polymer with the tertiary amine (including an ionen polymer) to quaternize.

formula (17)

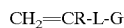

wherein R represents a hydrogen atom or a methyl group, L represents a divalent group; and G represents a group capable of reacting with a tertiary amine.

When a tertiary amine having two or more nitrogen atoms, an unreacted end tertiary amino group is quaternized with the above alkylating agent or aralkylating agent to stabilize.

(ii) A method is employed which comprises the steps of preparing an ethylenically unsaturated monomer having a quaternary ammonium group and then polymerizing the monomer.

In the same manner as (d) above, the method comprises the steps of reacting an ethylenically unsaturated monomer represented by formula (17) above, which is capable of being quaternized on reaction with a tertiary amine, with a tertiary amine (including an ionen polymer) to obtain an ethylenically unsaturated monomer having a quaternary ammonium group represented by the following formula (18) or (19) and then polymerizing the formula (XVI) monomer:

formula (18)

formula (19)

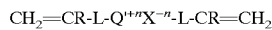

wherein R represents a hydrogen atom or a methyl group; L represents a divalent group; $Q^{+n}$ represents a group containing one or more quaternary ammonium groups which shows $Q_4$ in formula (1); $-Q^{+n}$ represents a divalent linkage group containing one or more quaternary ammonium groups which shows $Q_3$ in formula (1); and $X^{-n}$ represents a counter anion of the ammonium group.

The unreacted end tertiary amino group is quaternized with the above alkylating agent or aralkylating agent to stabilize.

(iii) An ethylenically unsaturated monomer having an ionen polymer chain is prepared and then polymerized. The ionen polymer prepared as described in (a) above is quaternized with the formula (17) monomer to obtain an ethylenically unsaturated monomer represented by the following formula (20) which has an ionen polymer chain or an ethylenically unsaturated monomer represented by the following formula (21) which is cross-linked with an ionen polymer chain. The resulting monomer is then polymerized.

formula (20)

formula (21)

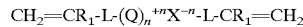

wherein $R_1$ represents a hydrogen atom or a methyl group; L represents a divalent group; $(Q)_n^{+n}X^{-n}$ represents an ionen polymer chain which shows $Q_1$ or $Q_2$ in formula (1); and $X^{-n}$ represents a counter anion of the ammonium group in the ionen polymer chain.

In formula (18) or (19), there is not mentioned of the alkyl or aralkyl group of the alkylating agent or aralkylating agent used to quaternize.

The synthetic method of the formula (2) or (3) compound is as follows:

(iv) A cross-linked ionen polymer is obtained only by a quaternizing reaction. An amine compound having at least two tertiary amine nitrogen atoms, a compound having at least two alkylating or aralkylating groups, and an amine compound having at least three tertiary amine nitrogen atoms or a compound having at least three alkylating or aralkylating groups are mixed and subjected to quaternization to obtain a cross-linked ionen polymer having a straight-chained or cross-linked structure.

(v) Similarly, a cross-linked ionen polymer is obtained only by a quaternizing reaction. A trivalent compound obtained by reacting an amine compound having at least three tertiary amine nitrogen atoms with an excessive compound having at least three alkylating or aralkylating groups are mixed with an amine compound having at least two tertiary amine nitrogen atoms and subjected to quaternization to obtain a cross-linked ionen polymer having a straight-chained or cross-linked structure. According to another method, having reaction, a trivalent compound obtained by reacting a compound having at least three alkylating or aralkylating groups with an amine compound having at least three tertiary amine nitrogen atoms is mixed with a compound having at least two alkylating or aralkylating groups and quaternization polymerized to obtain a cross-linked ionen polymer having a straight-chained or cross-linked structure.

The invention will be explained in greater detail.

The cyclic amine compound having two tertiary amine nitrogen atoms, which is a monomer unit constituting the ionen polymer in the invention represented by formula (I), (VI), (X), (4) or (8) includes piperazine, imidazolidine, pyrazolidine, triethylene diamine (referred to also as 1,4-azabicyclo [2,2,2] octane), pyrazine, pyrimidine, imidazole and imidazoline. The preferable is piperazine or triethylene diamine, and the more preferable is triethylene diamine. Herein, only the skeleton of the cyclic amines is described, and the substituent the amines may have or substituted amines are not described.

The cyclic amine compound having at least two tertiary amine nitrogen atoms, which is a monomer unit constituting the ionen polymer in the invention represented by formula (II), (VII), (XI), (5) or (9) includes 4,4'-bipyridine, 4,4'-trimethylenebipyridine, 4,4'-bipyrrole, 4,4'-bipyperidine and 3,3'-bipyrrolidine.

The amine compound, which is a monomer unit constituting the ionen polymer in the invention represented by formula (III), (VIII), (XII), (6), (10) or (11) includes ethylene diamine, propylene diamine, p-phenylene diamine and p-diaminomethyl phenylene. The preferable is p-diaminomethyl phenylene or ethylene diamine.

The amine compound, which is a monomer unit constituting the ionen polymer in the invention represented by formula (IV), (VIII), (IX) or (7) includes dimethylamine, diethylamine, methylethylamine, dicyclohexylamine and methylcyclohexylamine. The preferable is dimethylamine or diethylamine.

The amine compound represented by formula (XIV) includes pyridine, piperidine, morpholine, pyrrole, pyrroline, pyrrolidine, and quinacridine. The preferable is pyridine, piperidine, pyrrolidine and quinacridine.

It is needless to say that the amine compound is not limited to the above described.

In formula (1), A represents a monomer unit having at least two ethylenically unsaturated groups, and the monomer includes divinyl benzene, ethylene glycol diacrylate, ethylene glycol dimethacrylate, propylene glycol diacrylate, propylene glycol dimethacrylate, neopentylglycol dimethacrylate, tetramethylene glycol diacrylate and tetramethylene glycol dimethacrylate. The preferable is divinyl benzene, ethylene glycol diacrylate or ethylene glycol dimethacrylate.

In formula (1) or (V), B represents a copolymerizable monomer unit, and the monomer includes ethylene, propylene, 1-butene, isobutene, styrene, α-styrene, vinyltoluene, an aliphatic acid alkenyl ester (for example, vinyl acetate, allyl acetate), acrylates or methacrylates (for example, methyl acrylate, methyl methacrylate, ethyl acrylate, ethyl methacrylate, n-butyl acrylate, n-butyl methacrylate, hexyl methacrylate, n-octyl acrylate, benzyl acrylate, cyclohexyl methacrylate, 2-ethylhexyl acrylate and acrylo nitrile. The preferable is styrene, methyl acrylate, methyl methacrylate, ethyl acrylate, ethyl methacrylate, n-butyl acrylate, n-butyl methacrylate, benzyl acrylate or cyclohexyl methacrylate. B may be contain two or more of the copolymerizable monomer unit.

In the above formula, the anion of X includes a halogen ion such as a chlorine or bromine ion, an alkylsulfate ion such as a methylsulfate or ethylsulfate ion, and an alkyl or aryl sulfate ion such as a methanesulfonate, ethanesulfonate, benzenesulfonate or p-toluenesulfonate ion, each being preferable in the invention.

The compound capable of forming a divalent linkage group represented by W in the above formula is preferably 1,2-dichloroethane, 1,2-dibromoethane, 1,3-dichloropropane, 1,3-dibromopropane, m- and/or p-xylenedichloride (or p-dichlorometylbenzene) or m- and/or p-xylenedibromide (or p-dibromometylbenzene).

The end group M in $Q^1$ or $Q^2$ of formula (V) or $Q_2$ or $Q_4$ of formula (1) is preferably methyl, ethyl, benzyl, cyclohexylmetyl, or tosyl.

In formula (2) or (3), Y, a unit having a trivalency, is derived from a compound having three or more alkylating groups or a compound having three or more tertiary amino groups. The compound having three or more alkylating groups includes a trichloromethylalkane and a trichloromethylbenzene, and 1,2,4-trichloromethylbenzene, 1,2,3-trichloropropane or tetrachloromethylmethane is preferable. The compound having three or more tertiary amino groups includes N,N',N''-disubstituted 1,2,4-butanetriamine and N,N',N''-substituted trihydrotriazine. The alkylating agent is more preferable in the invention.

The ionen polymer referred to in the invention is a polymer having a repeating unit having an atomic group containing a tertiary ammonium group whose nitrogen atom is present in the main chain.

In formula (V), y is 0 to 90 mol %, preferably 0 to 50 mol %, q is 0 to 99 mol %, preferably 20 to 99 mol %, and s is 0 to 50 mol %, preferably 0 to 10 mol %.

In formula (1), x is 0 to 80 mol %, preferably 0 to 50 mol %, and more preferably 0 to 20 mol %, y is 0 to 90 mol %, preferably 0 to 50 mol %, p is 0 to 100 mol %, preferably 20 to 100 mol %, q is 0 to 99 mol %, preferably 20 to 99 mol %, r is 0 to 100 mol %, preferably 20 to 100 mol %, and s is 0 to 50 mol %, preferably 0 to 10 mol %.

The ethylenically unsaturated monomer represented by formula (V) or (1) is polymerized in the solution, suspension or emulsion form, and preferably in the emulsion form.

The surfactant used in the emulsion polymerization includes an anionic surfactant (for example, triton 770 produced by Rome & House Co., Ltd.), a cationic surfactant (for example, cetyltrimethylammonium chloride or stearyltrimethylammonium chloride), and a nonionic surfactant (for example, polyvinyl alcohol).

The initiator used in the emulsion polymerization includes potassium persulfate, ammonium persulfate, hydrogen peroxide, and the preferable is potassium persulfate or ammonium persulfate. The redox polymerization is preferably carried out using a combination of the persulfate with for example, potassium hydrogen sulfite.

The emulsion polymerization is carried out at 50 to 100° C., and preferably at 80 to 100° C.

The quaternizing reaction is carried out at −10 to 100° C., preferably 0 to 80° C. and more preferably 40 to 70° C.

In the emulsion copolymerization, a monomer solution containing an ethylenically unsaturated monomer having a quaternary amino group and another monomer and a polymerization initiator are simultaneously added to a heated water. When the monomers used are incompatible, an auxiliary solvent such as water, alcohol or acetone is used.

The example of the cationic conductive polymer in the invention represented by formula (I), (II), (III) (IV), (V), (1), (2) or (3) is listed below, but is not limited thereto.

IP-1

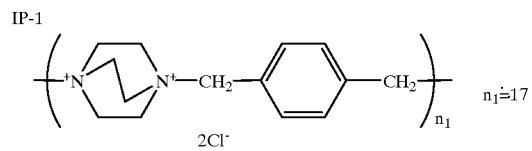

$n_1 \fallingdotseq 17$

IP-2

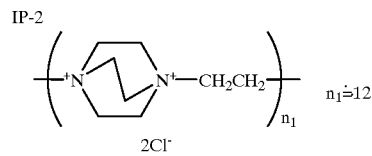

$n_1 \fallingdotseq 12$

IP-3
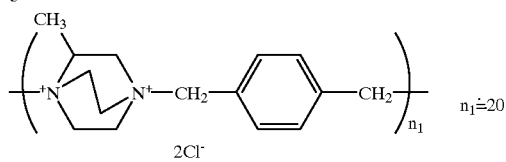
$n_1 \doteq 20$
IP-4
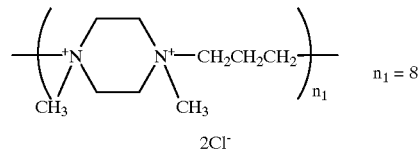
$n_1 = 8$
IP-5
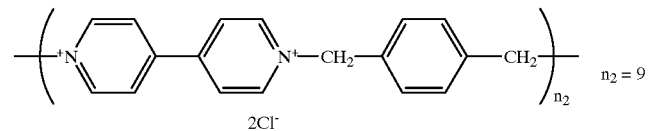
$n_2 = 9$
IP-6
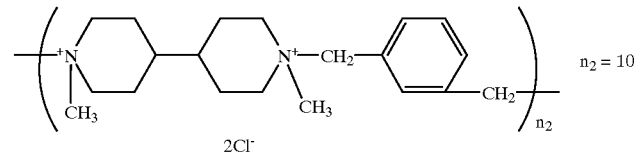
$n_2 = 10$
IP-7
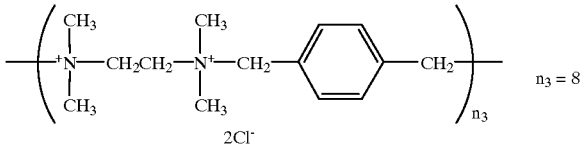
$n_3 = 8$
IP-8
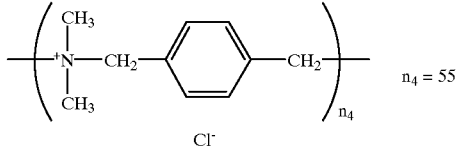
$n_4 = 55$
IP-9
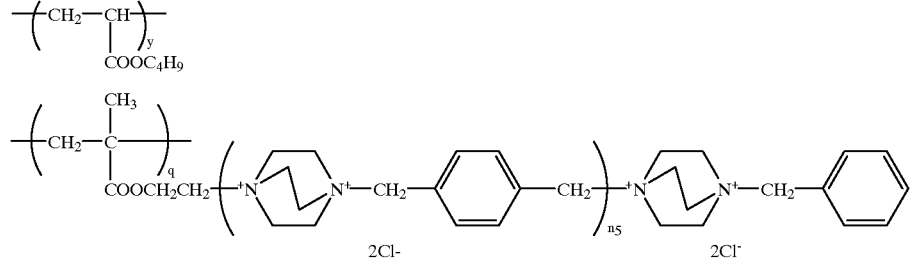
$y/q = 30/70$
$n_5 = 18$ -continued
IP-10
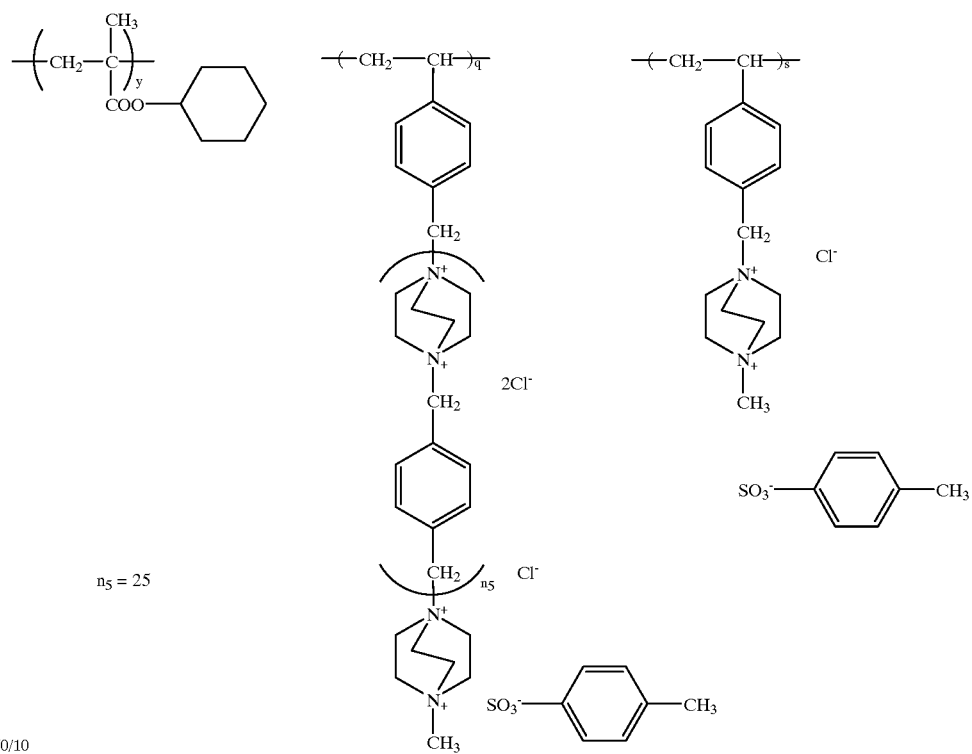
y/q/s = 20/70/10
IP-11
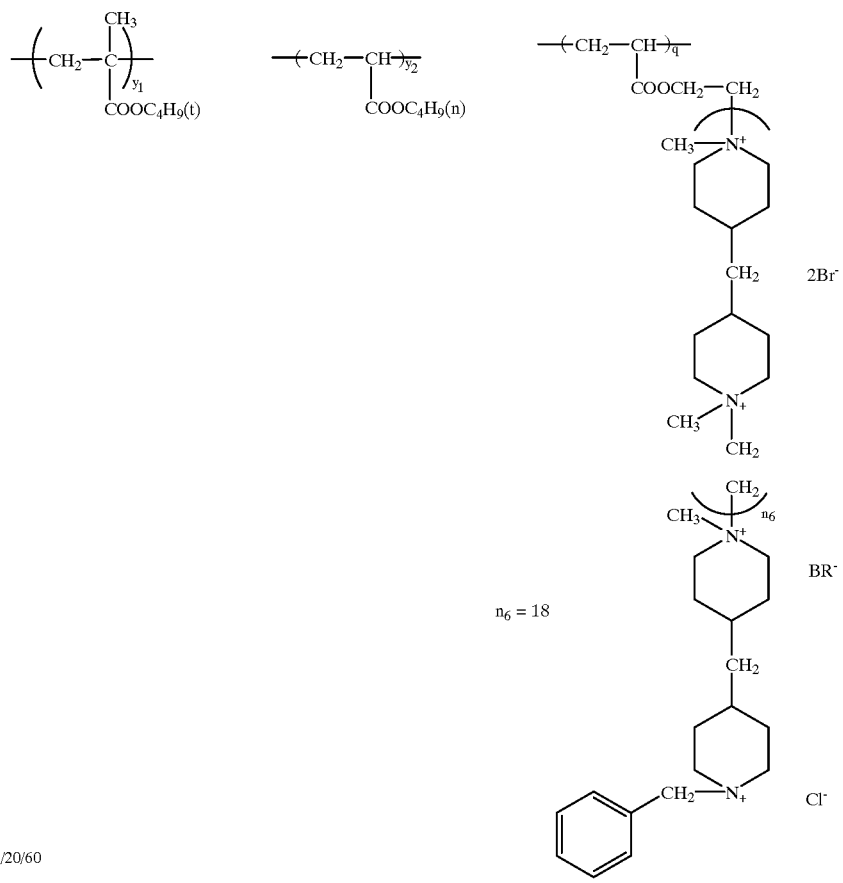
$y_1/y_2/q = 20/20/60$ IP-12
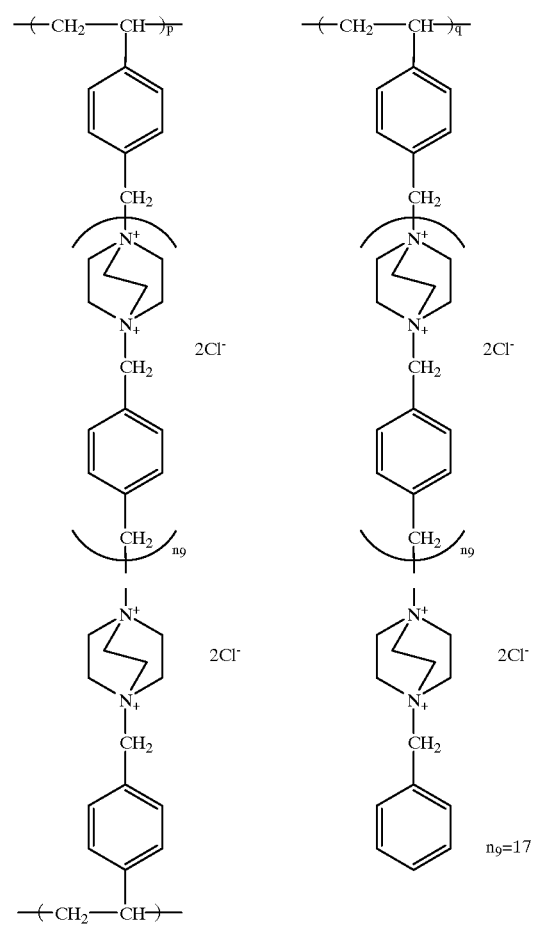
p/q = 50/50
IP-13
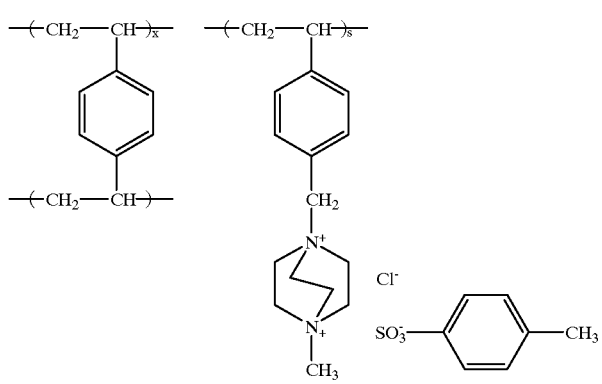
x/s = 30/70

-continued
IP-14
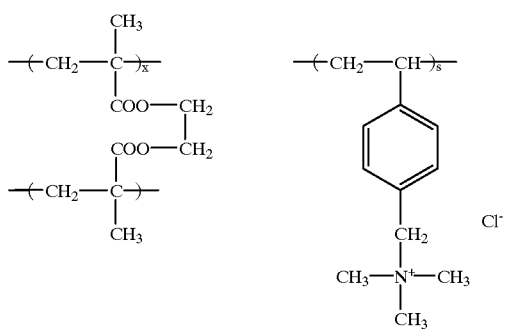
x/s = 5/95
IP-15
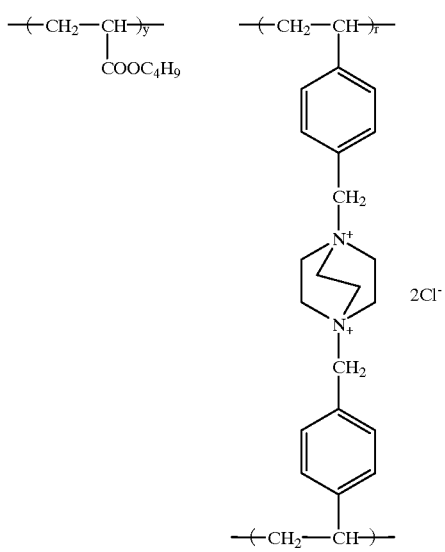
y/r = 7/93
IP-16
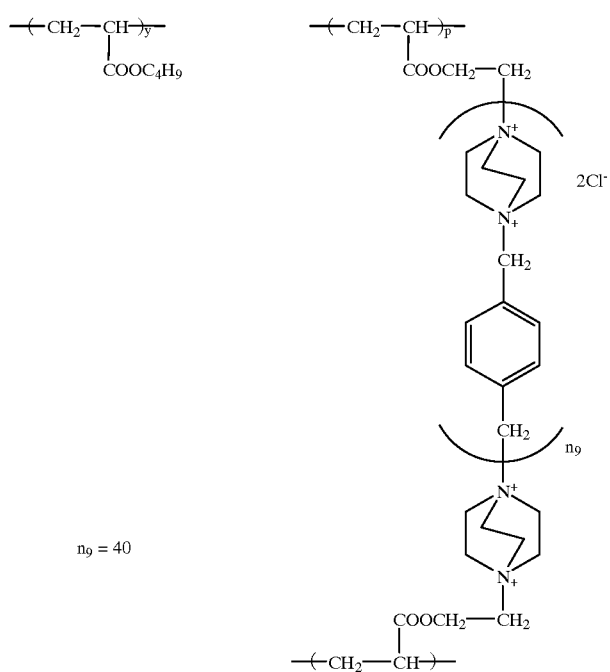
n₉ = 40
y/p = 50/50

-continued
IP-17
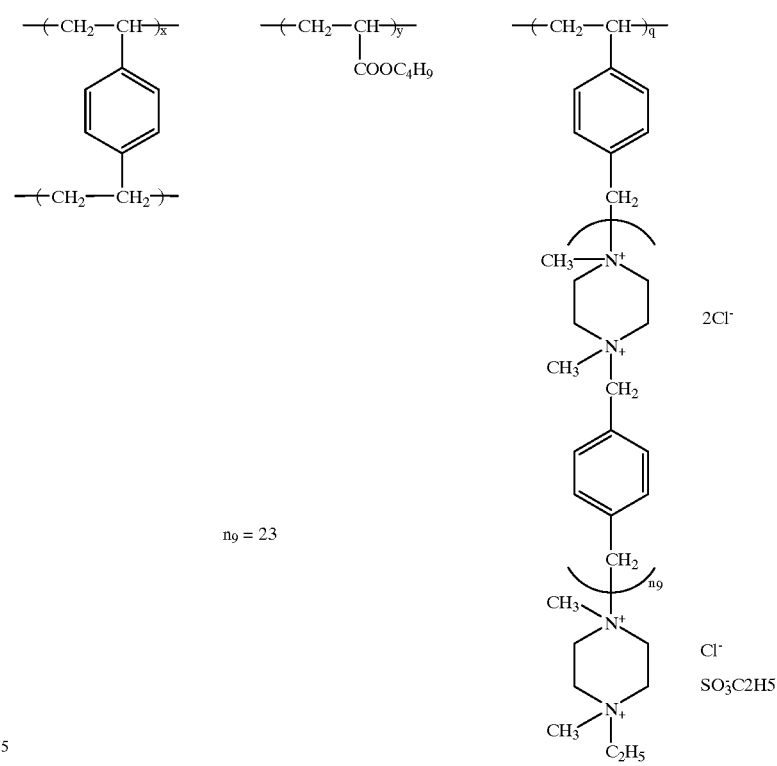
x/y/q = 5/20/75
n₉ = 23
IP-18
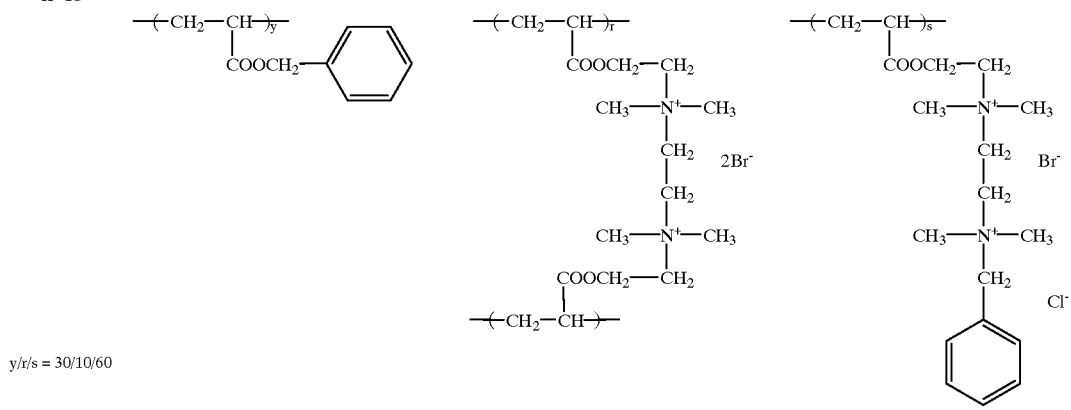
y/r/s = 30/10/60

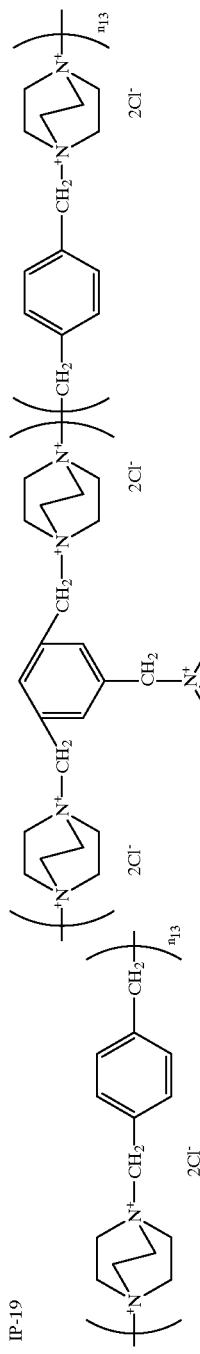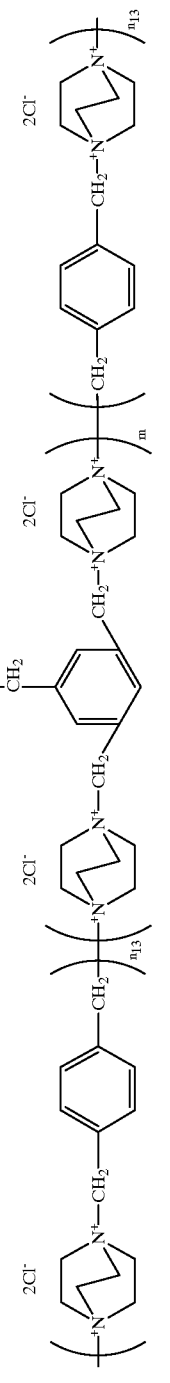

IP-20
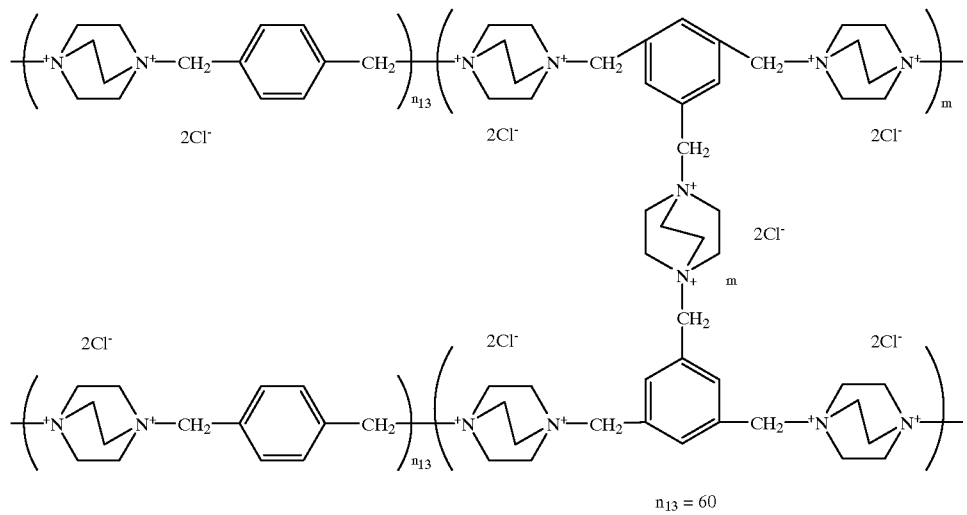
$n_{13}/m = 95/5$
IP-21
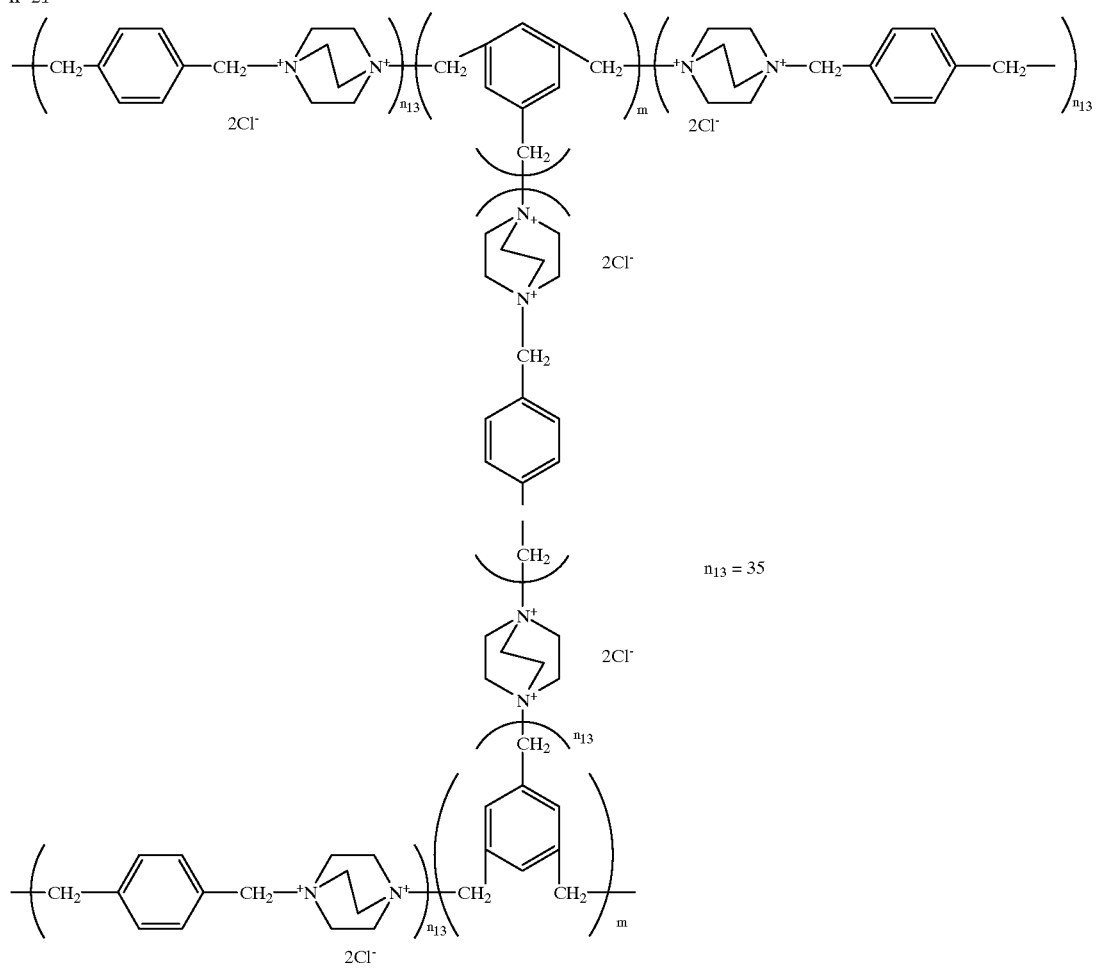
$n_{13}/m = 96/4$

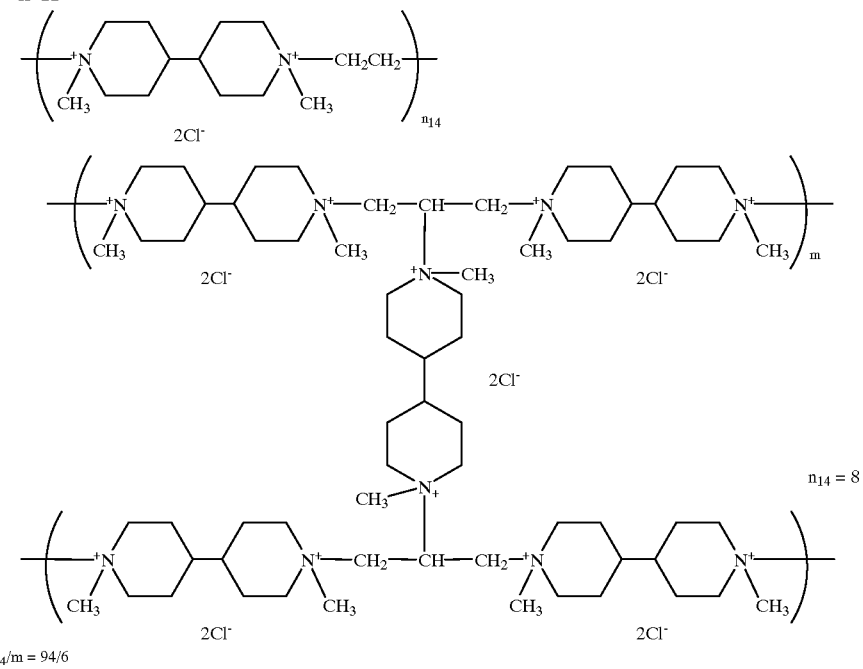

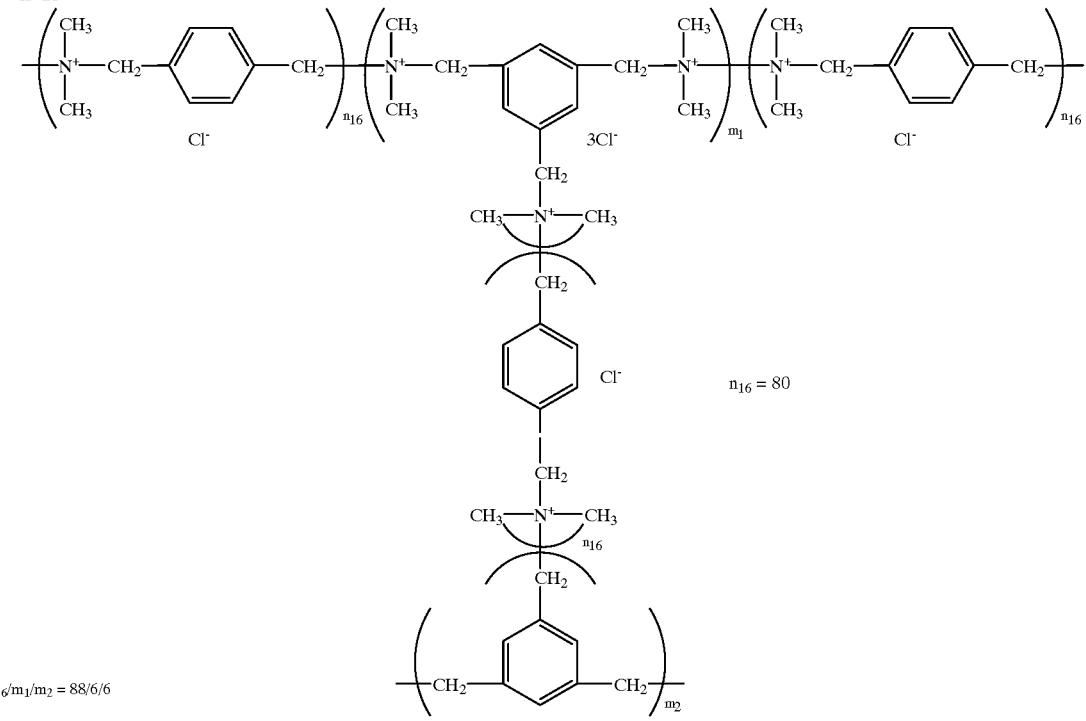

The repeated number (the n number in the above example) of the above repeated unit in the ionen polymer in the invention is 2–200, preferably 3–100 in view of conductivity, and more preferably 6–80 in view of ease of polymerization.

The cross-linked cationic polymer in the invention is characterized in that it is in the form of dispersed polymer particles, and can provide high concentration of a cation portion in the particles. Therefore, it has excellent conductivity and its conductivity is not lowered under low humidity. Further, a layer containing the conductive polymer has excellent mechanical strength, excellent chemical resistance, and good adhesion to another layer such as a support film.

The "dispersed polymer particles" herein referred to means particles which appear transparent or slightly turbid in the dispersion but is observed as dispersed particles by an electron microscope.

The cross-linked cationic conductive polymer in the invention has a particle size of ordinarily about 0.01 to 0.2 $\mu$m, and preferably 0.05 to 0.08 $\mu$m.

The amount used of the polymer represented by formula (1) varies depending on the usage, but is 0.01 to 2.0 g, and preferably 0.03 to 1.0 g per m$^2$ of protective film of a polarizing plate.

The ionen polymer represented by formulae (I) through (V) is used in combination with a hydrophobic binder. The hydrophobic binder used in the invention is not dissolved in water nor expanded by water. The hydrophobic binder herein referred to means a polymer having an equilibrium moisture content at 23° C. and 55% RH of not more than 10 weight % which is insoluble in water at ordinary temperature. The hydrophobic binder includes cellulose derivatives such as cellulose diacetate, cellulose triacetate, cellulose acetatebutyrate, cellulose acetatephthalate and cellulose nitrate, polyesters such as polycarbonate, polybutylene terephthalate and copolybutylene-tere/isophthalate, polyvinyl alcohol derivatives such as polyvinylformal, polyvinylacetal, polyvinylbutyral and polyvinylbenzal, and a norbornen type polymer containing norbornene. The hydrophobic binder is selected from the above, and preferably cellulose derivatives in view of processability or compatibility. The content ratio of the ionen conductive polymer to the hydrophobic polymer is 90:10 to 10:90, and preferably 70:30 to 30:70 in view of conductivity and coatability of the UV hardenable composition. The ratio is especially preferably 40:60 to 60:40.

The cross-linked cationic conductive polymer need not be mixed with the hydrophobic polymer, but may be mixed with the hydrophobic polymer.

When a coating solution containing the ionen conductive polymer and the hydrophobic polymer is coated on a transparent plastic film as an anti-static layer, a solvent for the coating solution includes water, methanol, ethanol, acetone, methylethyl ketone, cyclohexanone, ethyl acetate, amyl acetate, ethyl butyrate, acetonitrile, dioxane, dimethylformamide, formamide, dimethylsulfoxide, ethylene glycol, diethylene glycol, ethylene glycol monomethylether, ethylene glycol monoethylether, ethylene glycol diacetate, glycerin, and nitromethane. The preferable is methanol, ethanol, or acetone. The higher boiling point solvent of the above solvents is preferably mixed.

When a coating solution containing the cationic conductive polymer composition is coated, the above solvent is preferably used. A small amount of water may be mixed depending on the dispersion state.

In the invention, the coating solution for an anti-static layer is coated through a doctor coater, an extrusion coater, a slide coater, a roll coater, a gravure coater, a wire bar coater, a reverse-roll coater or a curtain coater or an extrusion coater employing a hopper disclose in U.S. Pat. No. 2,681,294.

The specific surface resistance of the anti-static layer in the invention, which is a measure of conductivity, is preferably not more than $10^{11}$ Ω/cm (20° C., 30% RH), and more preferably not more than $10^{10}$ Ω/cm.

The anti-static layer may contain a matting agent, a surfactant, a plasticizer, a slipping agent or a high boiling solvent, whereby the anti-static property or physical property is enhanced.

The synthetic example is explained below, but it is not limited thererto.

Synthetic Example 1

IP-13, N-vinylbenzyl-N'-methyl-triethylenediammonium-N-chloride-N'-p-toluenesulfonate-divinylbenzene copolymer (1) Compound 1 (quaternization of one nitrogen of triethylenediamine by p-chloromethylstyrene)

In a 1 liter three necked flask was placed a solution in which 94.8 g (0.84 mol) of triethylenediamine were dissolved in 500 ml of acetone and heated to 40° C. with stirring. To the solution, 64 g (0.42 mol) of p-chloromethylstyrene were dropwise added over one hour. After completion of the addition, the resulting mixture was refluxed for 4 hours, and cooled to produce precipitates. The resulting precipitates were filtered out to obtain 83.9 g of Compound 1.

(2) Compound 2 (quaternization of the other nitrogen of triethylenediamine by methyl p-toluene sulfonate)

In a 1 liter three necked flask were placed 66.2 g (0.25 mol) of Compound 1 and 500 ml of acetone and heated to 50° C. with stirring. To the resulting dispersion, 55.9 g (0.25 mol) of methyl p-toluene sulfonate were added, and the resulting mixture was refluxed for 3 hours and cooled to produce precipitates. The resulting precipitates were filtered out to obtain 72.4 g of Compound 2.

(3) Synthesis of Polymer dispersion IP-13

In a 1 liter four necked flask equipped with a stirrer, a condenser, a nitrogen introducing tube, a thermometer and two funnels were placed 1.1 g of polyoxyethylenenonylphenyl ether (the average number of a polyoxyethylene unit is 40) and 300 ml of distilled water and heated to 95° C. with stirring under a nitrogen atmosphere. To the solution, a solution in which 0.2 g of 2,2'-azobis(2-aminopropane) hydrochloride, as a polymerization initiator, were dissolved in 20 ml of distilled water, 3.95 g (0.03 mol) of divinylbenzene and a solution in which 30.5 g (0.07 mol) of Compound 2 were dissolved in 15 ml of ethanol were simultaneously added over one hour and polymerized. After completion of the addition, a solution in which 0.05 g of 2,2'-azobis(2-aminopropane)hydrochloride were dissolved in 5 ml of distilled water was further added, stirred at 95° C. for additional 1.5 hours and cooled to room temperature to obtain a polymer dispersion having 9.9% solids The polymer dispersion was poured with stirring in acetone of 8 times the dispersion volume to produce precipitates. The resulting precipitates were filtered out to obtain precipitates and redispersed in methanol. Thus, Polymer dispersion IP-13 was obtained.

Synthetic Example 2

IP-14, N-vinylbenzyl-N,N,N-trimethylammonium chloride-N'-ethylene glycol dimethacrylate copolymer (4) Synthesis of Compound 3 (Chloromethylstyrene-ethylene glycol dimethacrylate copolymer)

In a reaction vessel was placed a solution in which 70 g of sodium lauryl sulfate and 10 g of potassium persulfate were dissolved in 200 ml of water, and nitrogen was incorporated in the solution for 30 minutes at room temperature. To the resulting solution, a mixture of 420 g of m- and p-chloromethylstyrene and 139.5 g of ethylene glycol dimethacrylate and a solution in which 3.33 g of sodium bisulfite and 7.5 g of sodium lauryl sulfate were dissolved in 500 ml of water were dropwise added and stirred at 60° C. for 2 hours under a nitrogen atmosphere. The resulting polymer latex was cooled, filtered, diluted with a 5 liter water and adjusted to pH 7 with a 1N sodium hydroxide solution. Thus, Compound 3 was obtained.

(5) Quaternization

Compound 3 was cooled to 5° C. and mixed with 2410 g of a 25% trimethylamine aqueous solution. The resulting mixture was stirred at room temperature for 1 hour, stirred at 60° C. overnight, cooled to room temperature and poured with stirring in acetone of 8 times the mixture volume to produce precipitates. The acetone was removed by decantation. The resulting precipitations were washed with acetone two times. The washed precipitations were dispersed in the same amount of acetone, filtered out and were redispersed in methanol. Thus, Polymer dispersion having 17% solids was obtained.

Synthetic Example 3

Synthesis of IP-15, triethylenediammonium-bis-N,N'-di-p-methylstyrene-dichloride-n-butylacrylate copolymer (6) Compound 4 (p-chloromethylstyrene- n-butylacrylate copolymer)

In a 500 ml four necked flask equipped with a stirrer, a condensor, a nitrogen introducing tube and a thermometer was placed a solution in which 7.0 g of sodium lauryl sulfate and potassium persulfate were dissolved in 20 ml of distilled water with stirring under nitrogen atmosphere. To the resulting solution, a mixture of 142.0 g (0.93 mol) of m- and p-chloromethylstyrene and 9.0 g (0.07 mol) g of n-butyl acrylate and a solution in which 3.33 g of sodium bisulfite and 0.75 g of sodium lauryl sulfate were dissolved in 50 ml of distilled water were dropwise added simultaneously while stirring at 60° C. in 2 hours under a nitrogen atmosphere. After the addition, the resulting mixture was further stirred for 2 hours. The resulting polymer latex was diluted with 500 ml of distilled water, filtered, and adjusted to pH 7 with a 1N sodium hydroxide solution. Thus, Compound 4 was obtained.

(5) Quaternization and cross-linking due to trimethylenediamine

The Compound 4 was cooled to 5° C. and mixed with a solution in which 67.2 g (0.6 mol) of trimethylenediamine were dissolved in 200 ml of water. The resulting mixture was stirred at room temperature for 1 hour, stirred at 60° C. for 8 hours, cooled to room temperature and poured with stirring in acetone of 5 times the mixture volume to produce precipitates. The precipitates were filtered out and washed with the same amount of acetone three times. The washed precipitates were redispersed in methanol while stirring to obtain a dispersion having 10% solids.

Synthetic Example 4

Synthesis of IP-12, cross-linked copolymer in which an ionen polymer chain is sandwiched between the copolymer main chains (8) Ionen polymer IP-1

In a reaction vessel was placed a solution in which 210 g (1.2 mol) of p-xylenedichloride was dissolved in 500 ml of acetone. To the solution, a solution in which 180 g (1.6 mol) of triethylenediamine were dissolved in 300 g of acetonitrile was dropwise added at room temperature over 3 hours. After the addition, the resulting mixture was further stirred for 3 hours, and the resulting precipitates were filtered out and washed with 120 g of acetone. The washed precipitates were dissolved in 800 ml of water and stirred at 50° C. for 20 hours. The solution was poured in acetone of 5 times the solution volume. The resulting precipitates were filtered out and dried. The yield was 10 g. This precipitates were designated as IP-1.

(9) Synthesis of cross-linked monomer having an ionen polymer chain

To a solution in which 310 g of IP-I were dissolved in 800 ml of water and cooled to 5° C., 23 g (0.15 mol) of p-chloromethylstyrene were dropwise added in 3 hours and stirred at room temperature for additional 3 hours. The resulting solution was heated to 60° C., stirred for 8 hours, then cooled to room temperature and mixed with acetone of 5 times the mixture volume with stirring to produce precipitates. The precipitates were filtered out and washed with the same amount of acetone three times. The washed precipitates were redispersed in methanol while stirring to obtain a dispersion (Compound 5) having 10% solids. This Compound 5 was a mixture of a cross-linked monomer and a monomer in which an ionen polymer chain is pendent (50/50, by mole ratio).

(10) Quaternization of the tertiary amino group of the ionen polymer chain end with benzyl chloride Compound 5 was heated to 60° C. while introducing nitrogen, and a solution in which 6.4 g (0.05 mol) of benzyl chloride were dissolved in 100 ml of acetone was dropwise added in one hour. The resulting solution was further stirred for 3 hours. The resulting precipitates were filtered out and washed with acetone 2 times to obtain white powder, Compound 6. The yield was 350 g.

(11) Synthesis of cross-linked copolymer in which an ionen polymer chain is sandwiched between the copolymer main chains In a 2 liter four necked flask equipped with a stirrer, a condenser, a nitrogen introducing tube, a thermometer and two funnels were placed 1.1 g of polyoxyethylenenonylphenyl ether (the average number of a polyoxyethylene unit is 40) and 300 ml of distilled water and heated to 95° C. with stirring under nitrogen atmosphere. To the solution, a solution which 0.2 g of 2,2'-azobis(2-aminopropane) hydrochloride as a polymerization initiator was dissolved in 20 ml of distilled water and 210 g (0.02 mol) of Compound 6 were dissolved in 500 ml of ethanol were simultaneously added over one hour and polymerized. After completion of the addition, a solution which 0.05 g of 2,2'-azobis(2-aminopropane)hydrochloride was dissolved in 5 ml of distilled water was further added, stirred at 95° C. for aditional 1.5 hours and cooled to room temperature to obtain a polmer dispersion having a solid in an amount of 9.9%. The polymer dispersion was poured with stirring in acetone of 8 times the dispersion volume to produce precipitates. The resulting precipitates were filtered out to obtain precipitates and redispersed in methanol. Thus, Polymer dispersion IP-12 was obtained.

Synthetic Example 5

IP-19, Synthesis of cross-linked copolymer in which the copolymer main chains is cross linked with an ionen polymer chain

(12) Synthesis of Compound 7

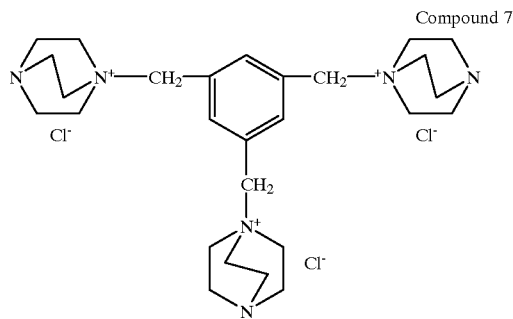

Compound 7

To a solution in which 44.8 g (0.2 mol) of 1,3,5-trichloromethylbenzene were dissolved in 200 ml of acetone, a solution in which 133.4 g of triethylenediamine were dissolved in 250 g of acetonitrile was dropwise added at 50° C. over 4 hours. After the addition, the resulting solution was cooled to room temperature and added with acetone of 2 times the solution volume. The resulting precipitates were filtered out, washed with 400 ml of acetone 2 times, and dried to obtain Compound 7. The yield was 89.6 g.

(13) IP-19 Synthesis of ionen cross-linked polymer

To a solution in which 9 g (0.0265 mol), a solution in which 236.5 g (1.35 mol) of p-xylenedichloride were dissolved in 450 ml of acetone was dropwise added and a solution in which 148.4 g (1.325 mol) of triethylenediamine were dissolved in 200 g of acetonitrile was dropwise added at 5° C., both being added over 3 hours. After the addition, the resulting mixture was further reacted at 50° C. for 5 hours to produce precipitates. A large amount of acetone were poured into the reaction mixture, and the resulting precipitates were filtered out, washed with acetone several times and dried to obtain white powder, IP-19. The yield was 305 g. This compound was swelled by water, but not soluble in water.

Synthetic Example 6

Synthesis of IP-21

To a solution in which 6 g (0.0265 mol) of 1,3,5-trichloromethylbenzene and 227.8 g (1.3 mol) of p-xylene dichloride were added to 1 liter of acetone, a solution in which 148.4 g (1.325 mol) of triethylenediamine were dissolved in 350 g of acetonitrile was dropwise added at 60° C. over 4 hours. After the addition, the resulting solution was further reacted for additional 4 hours, cooled to room temperature and added with a large amount of acetone. The resulting precipitates were filtered out, washed with acetone several times and dried to obtain IP-21. The yield was 290 g.

The exemplified compounds in which a synthetic method was not described were also synthesized according to the above described synthetic method.

The copolymer dispersion in the invention is stabilized as a water dispersion having coplymer particles by latex polymerization. However, a methanol copolymer dispersion, which is obtained by washing copolymer precipitaes with acetone to remove impurity as unpolymerized monomers and redispersing the washed precipitates in methanol, is more preferable in that the dispersion is more stable, easy to handle industrially and provides more excellent coatability. When a water copolymer dispersion is used, a methanol dispersion containing a small amount of methanol is added with a large amount of water.

The organic solvent which is used besides methanol includes ethanol, ethylene glycol monomethylether, ethylene glycol monoacetate, 1-methoxy-2-propanol, dimethylformamide, formamide, dioxane, and acetonitrile. The preferable is methanol or ethanol. As a diluent, acetone, methylethyl ketone or ethyl acetate is preferable and acetone is more preferable.

As comparative compounds, the following HP-1, HP-2, HP-3 and K-1 were used as described later. HP-1 can be prepared by copolymerizing styrene sulfonic acid with maleic anhydride according to a coventional method. HP-2 and HP-3 can be prepared by quaternization as above described. K-1 can be easily prepared by a conventional synthetic method of a cationic surfactant.

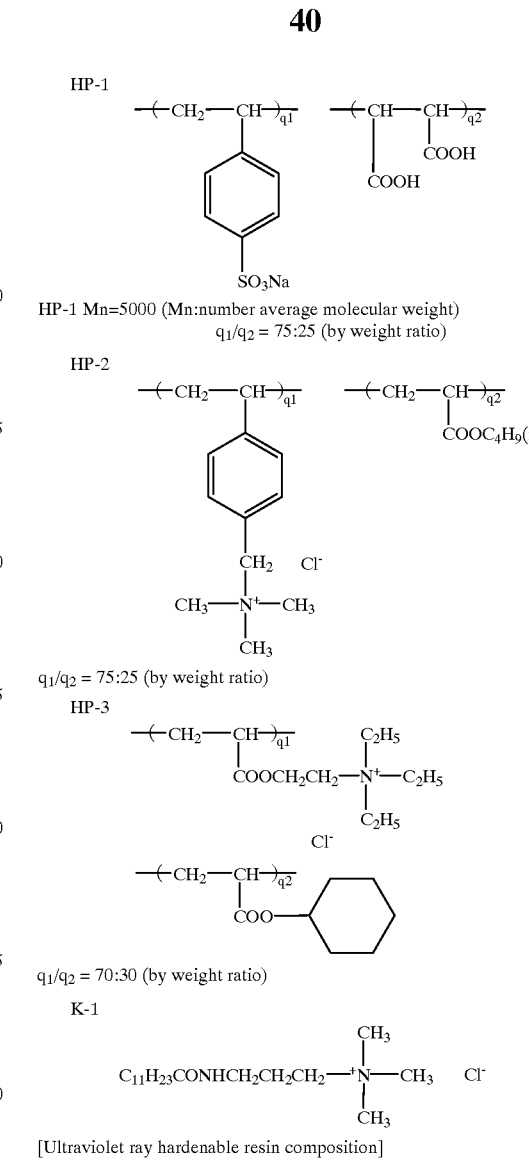

[Ultraviolet ray hardenable resin composition]

The ultraviolet (hereinafter referred to also as UV) ray hardenable resin in the invention may have a UV hardenable property that the composition is hardened by irradiating UV ray to form a hardened layer and is not specifically limited. The UV ray hardenable resin includes a UV ray hardenable acrylurethane resin, a UV ray hardenable polyesteracrylate resin, a UV ray hardenable epoxyacrylate resin, a UV ray hardenable polyolacrylate resin and a UV ray hardenable epoxy resin.

The UV ray hardenable acrylurethane resin can be obtained by reacting a polyesterpolyol with an isocyanate monomer or its prepolymer and then reacting the resulting product with an acrylate having a hydroxy group such as 2-hydroxyethylacrylate, 2-hydroxyethylmethacrylate (hereinafter, the acrylate includes a methacrylate) or 2-hydroxypropylacrylate (Japanese Patent O.P.I. Publication No. 59-151110/1984).

The UV ray hardenable polyesteracrylate resin can be obtained by reacting a polyesterpolyol with 2-hydroxyethylacrylate or 2-hydroxypropylacrylate (Japanese Patent O.P.I. Publication No. 59-151110/1984).

The example of the UV ray hardenable epoxyacrylate resin includes those obtained by reacting an epoxyacrylate oligomer in the presence of a reactive diluting agent and a photoinitiator (Japanese Patent O.P.I. Publication No. 1-105732/1989). The photoinitiator includes a benzoine derivative, an oxime ketone derivative, a benzophenone derivative or a thioxanthone derivative.

The example of the UV ray hardenable polyolacrylate resin includes trimethylolpropane triacrylate, ditrimethylolpropane tetraacrylate, pentaerythritol tetraacrylate, dipentaerythritol pentaacrylate, dipentaerythritol hexaacrylate or alkyl-modified dipentaerythritol pentaerythritol. These resins are usually used with a conventional photoinitiator. The above photoinitiator also works as a photo-sensitizer. The example includes acetophenones, benzophenones, hydroxy benzophenones, Michler's ketone, benzoylbenzoate, α-amyloxime esters, tetramethylthiuram monosulfide and thioxanthones or its derivatives. The photo-sensitizers such as n-butylamine, triethylamine and tri-n-butylphosphine can be used in reaction of epoxyacrylates.

The content of the photo-initiator or photo-sensitizer used in the ultraviolet ray hardenable resin composition is preferably 0.1 to 15 parts by weight, more preferably 1 to 10 parts by weight.

Although the exposure amount is varied depending on the kinds of light source, it may be 20–10,000 mJ/cm$^2$, and is more preferably 50–2,000 mJ/cm$^2$. The sensitizer having an absorption maximum in the range of from near-ultraviolet to visible wavelength is used.

The hardened layer preferably contains inorganic or organic matting agent in order to provide anti-glareness on the liquid crystal display device surface, prevent from adhesion to another substance and provide anti-scratch resistance. The inorganic matting agents include silicon oxide, titanium oxide, aluminum oxide, tin oxide, calcium carbonate, barium sulfate, talc, kaolin and calcium sulfate.

The organic matting agents include polymethylmethacrylate resin powder, silicon resin powder, polystyrene resin powder, polycarbonate resin powder, benzoguanamine resin powder, melamine resin powder, polyolefin resin powder, polyester resin powder, polyamide resin powder, polyimide resin powder and polyethylene fluoride resin powder.

These powders have an average volume diameter of 0.01 to 10 μm. The content of the powders is preferably 0.1 to 20 parts by weight based on the 100 parts by weight of the ultraviolet ray hardenable resin composition. In order to provide glare resistance, the content of the powders having an average diameter of 1 to 10 μm is preferably 1 to 15 parts by weight based on the 100 parts by weight of the ultraviolet ray hardenable resin composition. In order to provide blocking prevention, the content of the powders having an average volume diameter of 0.01 to 5 μm is preferably 0.1 to 5 parts by weight based on the 100 parts by weight of the ultraviolet ray hardenable resin composition.

In the invention, an ultraviolet ray hardenable resin composition is coated on the anti-static layer. The solvent for coating the ultraviolet ray hardenable resin composition includes methanol, ethanol, isopropanol, butanol, cyclohexanol, cyclohexanedimethanol, acetone, methylethyl ketone, methylisobutyl ketone, cyclohexanone, ethyl acetate, ethyl butyrate, ethylene glycol monomethyl ether, ethylene glycol monoacetate, ethylene glycol dimethyl ether, cyclohexane, hexane, dimethylformamide, formamide, acetonitrile and acetoamide. The above solvents require a drying step to remove them before and/or after UV irradiation for hardening. The following polymerizable solvents are preferable in that they remain in solid in a UV ray hardened composition after hardening. The polymerizable solvents include ethylene glycol diacrylate, propylene glycol diacrylate, divinylbenzene, 1,4-cyclohexane diacrylate, 1,4-cyclohexyldimethyl diacrylate, trimethylol propane triacrylate, and pentaerythritol tetraacrylate. Of these, the monomers having two or more ethylenically unsaturated bonds are preferable. The ultraviolet ray hardenable resin composition coating solution has a solid content of preferably 10 to 95% by weight, and the solid concentration is optimally selected depending on a coating method. The ultraviolet ray hardenable resin composition may be used without diluting with solvents.

The coating solution of the ultraviolet ray hardenable resin composition is coated through a gravure coater, a spinner coater, a wire bar coater, a roll coater, a reverse-roll coater, an extrusion coater or an air-doctor coater, and the dry coating thickness is preferably 0.1 to 30 μm, and more preferably 0.5 to 15 μm.

The coated layer is irradiated with ultraviolet rays for preferably 0.5 seconds to 5 minutes, and more preferably 3 seconds to 3 minutes, in view of hardening efficiency or workability.

The crystal liquid panel in which the polarizing plate protective film for a polarizing plate or the polarizing plate is provided is used in a personal computer or word processor in a room, but the panel may be used in a car-navigator in summer. Therefore, light fastness or heat stability of the panel is required. The UV light hardenable resin composition may contain a UV absorbent to enhance light fastness, as long as its hardening by UV irradiation is not jeopardized. The UV absorbent includes those as described above which may be contained in the transparent plastic film.

In order to enhance heat stability, the hardened layer may contain an anti-oxidant which does not inhibit light hardening. The example thereof includes a hindered phenol derivative, a thiopropionic acid derivative and a phosphite, for example, 4,4'-thiobis(6-t-3-methylphenol), 4,4'-vinylidenebis(6-t-butyl-3-methylphenol), 1,3,5-tris(3,5-di-t-butyl-4-hydroxybenzyl)isocyanurate, 2,4,6-tris(3,5-di-t-butyl-4-hydroxybenzyl)mesitylene, dioctadecyl-4-hydroxy-3,5-di-t-butylbenzylphosphate.

[Adhesion layer]

The adhesion layer is preferably provided on the surface of a support opposite the hardened layer to enhance adhesion to the polarizing film. The adhesion layer may be one or more layers.

The adhesion layer is a layer having a hydrophilic polymer. The hydrophilic polymer in the invention includes a hydrophilic polymer containing a carboxy group represented by the following formula (22) or (23), a hydrophilic cellulose derivative such as cellulose methylether, carboxymethyl cellulose or hydroxyethyl cellulose, partially hydrolyzed polyvinyl acetate, a polyvinyl alcohol derivative such as polyvinyl alcohol partially formal or partially benzal, a natural polymer such as gelatin, casein or gum arabic or a sulfonic acid group containing polyester derivative. The a hydrophilic polymer containing a carboxy group represented by the following formula (22) or (23) is preferable.

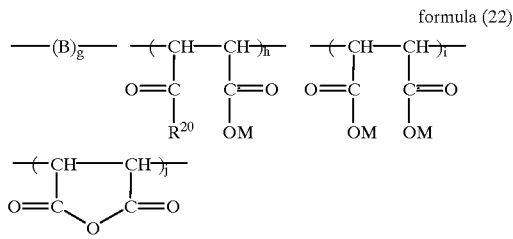

formula (22)

-continued

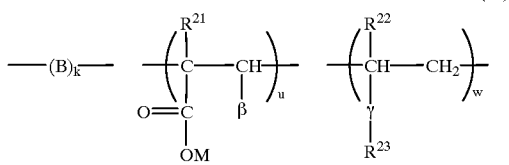

formula (23)

In formula (22) or (23) above, B represents those as denoted in B of formula (V) or (1); β represents a hydrogen atom, —COOM, in which M represents a hydrogen atom or a cation, or —(CO)—$R^{20}$, in which $R^{20}$ represents —OR' or —N(R')(R'') in which R' represents a substituted or unsubstituted alkyl group, a substituted or unsubstituted alkyloxyalkyl group, a substituted or unsubstituted aralkyl group, a substituted or unsubstituted aryl group, a substituted or unsubstituted heterocyclic residue or a non-metallic atomic group necessary to form a heterocyclic ring together with R'', and R'' represents a hydrogen atom, an alkyl group or a non-metallic atomic group necessary to form a heterocyclic ring together with R', provided that when w=0, β is a hydrogen atom, and when R represents an alkyl group, B is a hydrogen atom; $R^{21}$ and $R^{22}$ independently represent a hydrogen atom or a methyl group; γ represens —(CO)O— or —O(CO)—; $R^{23}$ represents a halogenated alkyl group or a halogenated alkyloxyalkyl group; and g, h, i, j, k, u and w independently represent mol %, in which g is 0 to 60, h is 0 to 100, i is 0 to 100, j is 0 to 100, k is 0 to 60, u is 0 to 100, w is 0 to 100, g+h+i+j =100 and k+u+w =100.

In above formula (22) or (23), the alkyl or alkyloxyalkyl represented group by R' includes an alkyl or alkyloxyalkyl group having preferably 1 to 24 carbon atoms, and may be straight-chained, branched or cyclic. The alkyl or alkyloxyalkyl group may have a substituent such as a hydroxy group, a hydroxy carbonyl group, an oxycarbonyl group having a cation and a halogen atom. The halogen substituted is preferably a halogenated (particularly fluorinated) alkyl group or halogenated (particularly fluorinated) alkyloxyalkyl group. The number of the halogen atom in the halogenated alkyl, alkyloxyalkyl or cycloalkyl group is 1 to 37. R' in formulae (22) and (23) may be the halogenated alkyl or alkyloxyalkyl group represented by $R^{23}$ in formula (23), and the halogenated alkyl or alkyloxyalkyl group represented is represented by the following formula (24):

formula (24)

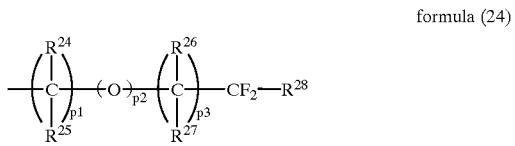

In Formula (A), $R^{24}, R^{25}, R^{26}, R^{27}$ and $R^{28}$ independently represent a hydrogen atom or a fluorine atom; $p_2$ represents 0 or 1, provided that when $p_2$ is 0, $p_1$ represents 2 or 3; $p_3$ represents an integer of 1 or 17; and $n_1+n_2$=1 to 17. When the number of $R^{24}$ is 2 or more, the plural $R_4$'s may be different as one of $R_4$'s is hydrogen while others are fluorine. Similarly, plural $R_{25}$'s, $R_{26}$'s, $R_{27}$'s and $R_{28}$'s may be different, respectively.

The aryl or aralkyl group represented by R' may have a substituent such as a fluorine-, chlorine- or bromine-containing alkyl group having 1–4 carbon atoms, a hydroxyl group, a hydroxycarbonyl group, an oxycarbonyl group, a nitrile group or a nitro group, in addition to the substituent described above. The heterocyclic ring represented by R' or the heterocyclic ring represented by R' and R'' is a saturated or unsaturated heterocyclic ring containing an oxygen, sulfur or nitrogen atom. The example includes a heterocyclic ring selected from aziridine, pyrrole, pyrrolidine, pyrazole, oxazine, morpholine, and thiazine. The cation represented by M includes an ammonium, sodium, potassium or lithium ion.

The polymer containing a —COOM group represented by the above formula can be used singly or in admixture of two or more kinds. The number average molecular weight of the polymer is preferably 500 to 500,000.

The polymer represented by formula (22) or (23) can be synthesized by a conventional method. The maleic anhydride copolymer is a well known polymeric compound, and its derivative can be easily prepared by reaction with alcohols or amines, and can be also prepared by copolymerizing a purified maleic anhydride derivative, which is obtained by reacting maleic anhydride with alcohols or amines, with another vinyl monomer. The acrylates having a halogenated alkyl group or a halogenated alkyloxyalkyl group can be easily synthesized by a synthetic method of a monomer and polymer disclosed in Journal of Polymer Science, 15, 515—574 (1955) or British Patent No. 1,121,357.

The typical examples of the polymer represented by formula (22) or (23) will be shown below, but is not limited thereto.

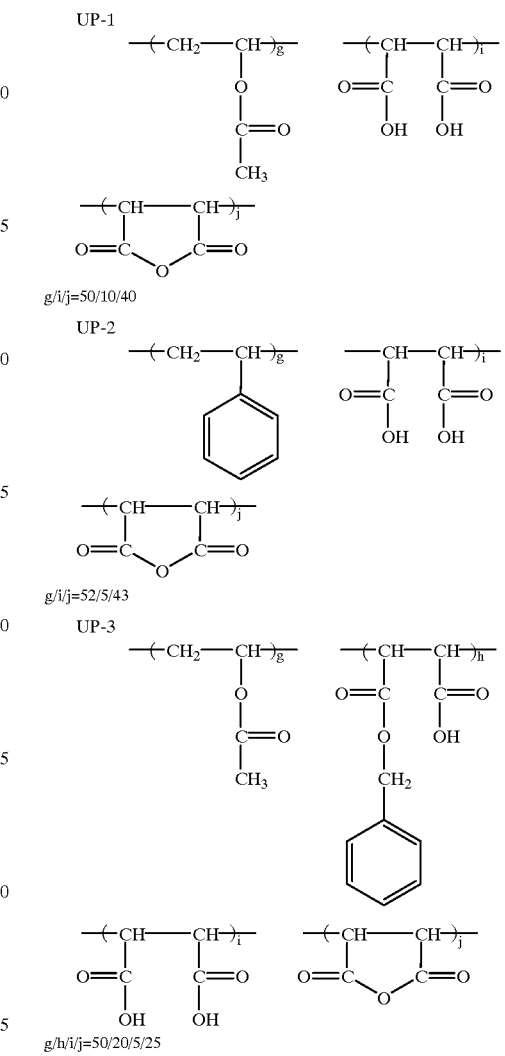

UP-4

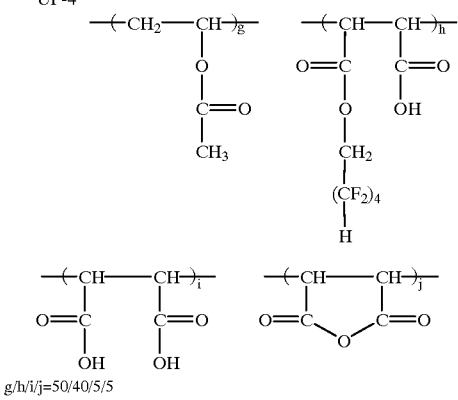

g/h/i/j=50/40/5/5

UP-5

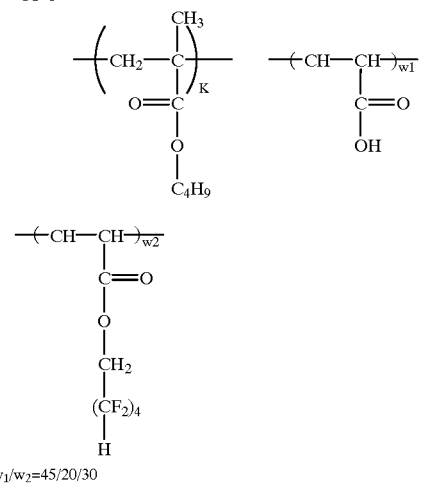

k/w₁/w₂=45/20/30

UP-6

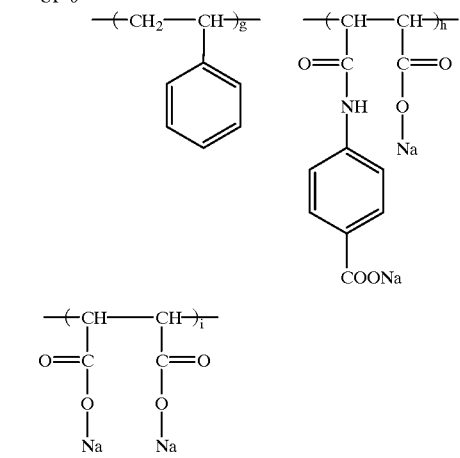

g/h/i=70/15/15

UP-7

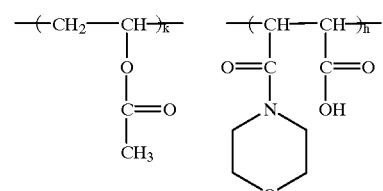

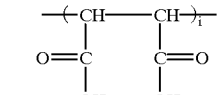

k/h/i=50/45/5

UP-8

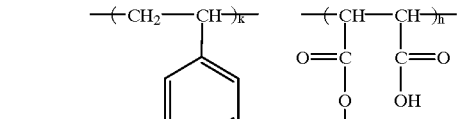

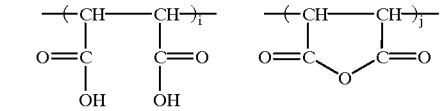

k/h/i=52/20/20/8

The amount used of the polymer represented by Formula (22) or (23) is preferably 10 to 1000 mg/m², and more preferably 20 to 300 mg/m².

The solvent, which is used for an adhesion layer composition coating solution for coating the adhesion layer includes water, methanol, ethanol, propanol, acetone, methylethyl ketone, ethyl acetate, toluene, methylene chloride, methyl lactate, ethyl lactate, methyl butyrate, tetrahydrofurane, ethylene glycol, propylene glycol, ethylene glycol monomethylether, dimethylformamide or its mixture.

The hydrophilic polymer content of the adhesion layer composition coating solution is 20 to 1000 g/liter, and preferably 200 to 700 g/liter.

The adhesion layer composition coating solution used in the invention can be coated by the above described coating method. After the coating, the coated layer is dried to minimize a residual solvent, since when the residual solvent is too much, bubbles are likely to produce between the polarizing film surface and the coated layer. The content of the residual solvent is 5% or less by weight.

The adhesion layer composition coating solution used in the invention optionally contains an ultraviolet absorbent, a lubricant, a matting agent, an antistatic agent, a cross-linking agent or a surfactant.

The addition of the cross-linking agent is preferable in view of enhancing adhesion between the polarizing film and the adhesion layer. The cross-linking agent includes an epoxy compound, an aziridine compound, an isocyanate compound, alum and a boron-containing compound. The PVA hydrophilic layer is provided on the adhesion layer by continuous coating, preferably in-line casting continuous coating.

[PVA hydrophilic layer]

On the above adhesion layer the following PVA hydrophilic layer is optionally provided, whereby the polarizing film is easily adhered to the protective film for a polarizing plate. The PVA hydrophilic polymer of the PVA hydrophilic layer includes a water-soluble adhesive such as polyvinyl alcohol or polyvinyl partial formal or polyvinyl partial butyral. The PVA hydrophilic layer is provided on the adhesion layer by continuous coating, preferably in-line casting continuous coating.

[Polarizing plate]

The polarizing plate is obtained by providing on both surfaces of a polarizing film an anti-static layer and a UV ray hardened layer in that order and then providing the above described protective film on the hardened layer.

The polarizing film is obtained by immersing a PVA film in an aqueous solution containing iodine or an iodine compound and a dye and stretching the resulting film in one direction by a factor of 2 to 5. Since the stretched PVA film is brittle, and can not be wound up, it is necessary to laminate both surfaces of the stretched film with a protective film for a polarizing plate. The conventional laminating method comprises the steps of coating an aqueous adhesion auxiliary (for example, an aqueous PVA solution or latex) on the saponified surface of the protective film and/or on the surface of the stretched PVA polarizing film, laminating both films, applying pressure to the laminated film through a pressure applying member and then drying the resulting film while transporting on the rollers.

In the polarizing plate of the invention, strong adhesion between the protective film and the polarizing film is obtained due to the adhesion layer and the PVA hydrophilic layer described above. In addition, the present invention is characterized in that the use of only water as the above adhesion auxiliary gives strong adhesion between the protective film and the polarizing film.

EXAMPLE

The invention will be detailed according to the following examples, but is not limited thereto.

[Preparation of samples]

The samples were prepared as follows:

(Protective films 1A, 1B and 1C for a polarizing plate)

<Sample discontinuously coated>

The following anti-static coating composition (1) was coated on one side of a 80 $\mu$m thick TAC film (Konicatac 80UV-S produced by Konica Corp.) to be 20 ml/m$^2$, dried at 90° C. for 10 minutes to form an anti-static layer (1A) and wound up. Thereafter, the following adhesion layer coating composition (1) was coated on the surface of the film opposite the anti-static layer (1A) to be 25 ml/m$^2$, dried at 90° C. for 10 minutes to form an adhesion layer (1A) and wound up. The following UV ray hardenable resin coating composition (1) was coated on the anti-static layer (1A), dried at 90° C. for 5 minutes, exposed (UV irradiated) for 4 seconds to light of a 60 W/cm$^2$ high pressure mercury lamp 10 cm distant from the coated layer to obtain a hardened layer (1A) having a thickness of 3 $\mu$m, and wound up.

Thus, protective film 1A was obtained.

<Sample continuously coated>

The anti-static coating composition (1) was coated on one side of a 80 $\mu$m thick TAC film (Konicatac 80UV-S produced by Konica Corp.) to be 20 ml/m$^2$, dried at 90° C. for 1 minute to form an anti-static layer (1B), the adhesion layer coating composition (1) was coated on the surface of the film opposite the anti-static layer (1B) to be 25 ml/m$^2$, dried at 90° C. for 1 minute to form an adhesion layer (1B), and then, the UV ray hardenable resin coating composition (1) was coated on the anti-static layer (1B), dried at 90° C. for 5 minutes, exposed for 4 seconds (UV irradiated) to light of a 60 W/cm$^2$ high pressure mercury lamp 10 cm distant from the coated layer to obtain a hardened layer (1B) having a thickness of 3 $\mu$m and wound up.

Thus, protective film 1B was obtained.

<Sample in-line coated>

The following TAC dope was filtered, cast from a die while applying pressure on an endless stainless steel band and dried to have a thickness of 80 $\mu$m. The resulting dope film containing 100% of the residual solvent was separated from the stainless steel band immediately before one round of the belt, and dried while transporting on the rollers to give 20% of the residual solvent. Thereafter, the anti-static coating composition (1) was coated on the resulting film to be 20 ml/m$^2$, dried for 1 minute to form an anti-static layer (1C), the adhesion layer coating composition (1) was coated on the surface of the film opposite the anti-static layer (1C) to be 25 ml/m$^2$, dried for 1 minute to form an adhesion layer (1C), and then, the UV ray hardenable resin coating composition (1) was coated on the anti-static layer (1C), dried at 90° C. for 1 minute, exposed for 4 seconds (UV irradiated) to light of a 60 W/cm$^2$ high pressure mercury lamp 10 cm distant from the coated layer to obtain a hardened layer (1C) having a thickness of 3 $\mu$m, further dried to give 3% of the residual solvent of the TAC film and wound up.

Thus, protective film 1C was obtained.

<<Anti-static coating composition (1)>>

| | |
|---|---|
| IP-1 | 0.5 parts by weight |
| Water | 1 part by weight |
| 5% Cellulose acetate (hereinafter referred to as DAC) acetone solution | 10 parts by weight |
| Diethylene glycol | 2 parts by weight |
| Methanol | 43 parts by weight |
| Acetone | 45 parts by weight |

<<Adhesion layer coating composition (1)>>

| | |
|---|---|
| 5% UP-1 acetone solution | 20 parts by weight |
| Water | 2 parts by weight |
| Methanol | 38 parts by weight |
| Acetone | 40 parts by weight |

<<UV ray hardenable resin composition (1)>>

| | |
|---|---|
| Polyester acrylate resin (Somacoat TF-232 produced by Somar Kogyo Co., Ltd.) | 50 parts by weight |
| Photo-initiator (Irgacure-184 produced by Ciba Geigy Co., Ltd.) | 3 parts by weight |
| Ethyl acetate | 30 parts by weight |
| Toluene | 20 parts by weight |

<<TAP dope>>

The TAC dope (viscous solution) was prepared through a dissolving vessel which had the following dope composition.

| | |
|---|---|
| TAC | 1855 kg |
| TPP | 185 kg |
| A mixture solvent of methylene chloride and ethanol (9:1 by weight) | 9791 kg |
| UV absorbent (1)* | 90 kg |

* 2-ethylhexyl-2-cyano-3,3'-diphenylacrylate (Protective films 2A, 2B and 2C for a polarizing plate)

Protective films 2A, 2B and 2C were prepared in the same manner as in Protective films 1A, 1B and 1C, except that the following anti-static coating composition (2), the following adhesion layer coating composition (2) and the following UV ray hardenable resin composition (2) were used instead of anti-static coating composition (1), adhesion layer coating composition (1) and UV ray hardenable resin composition (1).

<<Anti-static coating composition (2)>>

| | |
|---|---|
| IP-13 | 0.5 parts by weight |
| Water | 1 part by weight |
| Diethylene glycol | 2 parts by weight |

-continued

| | |
|---|---|
| Methanol | 37 parts by weight |
| Acetone | 50 parts by weight |

<<Adhesion layer coating composition (2)>>

| | |
|---|---|
| UP-1 | 0.5 parts by weight |
| Ethyl acetate | 50 parts by weight |
| Acetone | 50 parts by weight |

<<UV ray hardenable resin composition (2)>>

| | |
|---|---|
| Polyesteracrylate resin and polyurethaneacrylate resin (EXG produced by Dainichiseika Kogyo Co., Ltd.) | 45 parts by weight |
| Silica fine particles (Silia 431 produced by Fuji Silicia Co., Ltd.) | 5 parts by weight |
| Ethyl acetate | 25 parts by weight |
| Toluene | 25 parts by weight |

The above composition was dispersed by an ultrasonic disperser for 30 minutes to obtain a coating solution.

(Protective films 3A, 3B and 3C for a polarizing plate)

Protective films 3A, 3B and 3C were prepared in the same manner as in Protective films 2A, 2B and 2C, except that the following anti-static coating composition (3) was used instead of anti-static coating composition (2). Thus, protective film 3A having an anti-static layer 3A, an adhesion layer 3A and a hardened layer 3A, protective film 3B having an anti-static layer 3B, an adhesion layer 3B and a hardened layer 3B and protective film 3C having an anti-static layer 3C, an adhesion layer 3C and a hardened layer 3C were wound up, respectively.

<<Anti-static coating composition (3)>>

| | |
|---|---|
| IP-16 | 0.5 parts by weight |
| Water | 1 part by weight |
| Ethylene glycol | 2 parts by weight |
| Methanol | 77 parts by weight |
| Acetone | 20 parts by weight |

(Protective films 4A, 4B and 4C for a polarizing plate)

Protective films 4A, 4B and 4C were prepared in the same manner as in Protective films 2A, 2B and 2C, except that the following anti-static coating composition (4) was used instead of anti-static coating composition (2) and the following UV ray hardenable resin composition (3) was used instead of UV ray hardenable resin composition (2). Thus, protective film 4A having an anti-static layer 4A, an adhesion layer 4A and a hardened layer 4A, protective film 4B having an anti-static layer 4B, an adhesion layer 4B and a hardened layer 4B and protective film 4C having an anti-static layer 4C, an adhesion layer 4C and a hardened layer 4C were wound up, respectively.

<<Anti-static coating composition (4)>>

| | |
|---|---|
| IP-19 | 0.5 parts by weight |
| Water | 1 part by weight |
| Diethylene glycol | 2 parts by weight |
| Methanol | 47 parts by weight |
| Acetone | 50 parts by weight |

<<UV ray hardenable resin composition (3)>>

| | |
|---|---|
| Polyfunctional acrylate resin (Adecaoptomer KR-566 produced by Asahi Denka Kogyo Co., Ltd.) | 30 parts by weight |
| Polymethylmethacrylate fine particles (MX-300 having an average size of 3 μm produced by Soken Kagaku Co., Ltd.) | 1.8 parts by weight |
| Toluene | 70 parts by weight |

(Protective films 5A, 5B and 5C for a polarizing plate)

Protective films 5A and 5B were prepared in the same manner as in Protective films 1A and 1B, respectively, except that a 80 μm thick PC film (produced by Teijin Co., Ltd., which was corona discharged, was used instead of the TAC film. Thus, protective film 5A having an anti-static layer 5A, an adhesion layer 5A and a hardened layer 5A and protective film 5B having an anti-static layer 5B, an adhesion layer 5B and a hardened layer 5B were wound up, respectively.

Protective film 5C having an anti-static layer 5C, an adhesion layer 5C and a hardened layer 5C was prepared in the same manner as in Protective film 1C, except that the following PC dope, was used instead of the TAC dope.

<<PC dope>>

The PC dope (viscous solution) was prepared through a dissolving vessel which had the following dope composition.

| | |
|---|---|
| PC resin (2-(2'-hydroxy-3',5'-di-t-butylphenyl type, a viscosity average molecular weight: 40,000) | 1855 kg |
| A mixture solvent of methylene chloride and ethanol (9:1 by weight) | 9791 kg |
| UV absorbent (2)* | 90 kg |

UV absorbent (2)* 2-(2'-hydroxy-5'-methylphenyl)benzotriazole (Protective film 6C for a polarizing plate)

Protective film 6C having an anti-static layer 6C, an adhesion layer 6C and a hardened layer 6C was prepared in the same manner as in Protective film 4C, except that anti-static coating composition (5) was used instead of anti-static coating composition (4).

<<Anti-static coating composition (5)>>

| | |
|---|---|
| IP-14 | 0.5 parts by weight |
| Water | 1 part by weight |
| Ethylene glycol | 2 parts by weight |
| Methanol | 37 parts by weight |
| Acetone | 50 parts by weight |

(Protective film 7C for a polarizing plate)

Protective film 7C having an anti-static layer 7C, an adhesion layer 7C and a hardened layer 7C was prepared in the same manner as in Protective film 4C, except that anti-static coating composition (6) was used instead of anti-static coating composition (4).

<<Anti-static coating composition (6)>>

| | |
|---|---|
| IP-10 | 0.5 parts by weight |
| DAC 5% solution | 10 parts by weight |
| Water | 1 part by weight |
| Diethylene glycol | 2 parts by weight |
| Methanol | 27 parts by weight |
| Acetone | 30 parts by weight |
| Ethyl acetate | 25 parts by weight |

| Isopropyl alcohol | 5 parts by weight |
| Methanol | 27 parts by weight |
| Acetone | 30 parts by weight |

(Protective films 8A, 8B and 8C for a polarizing plate)

Protective film 8A was prepared in the same manner as in Protective film 1A, except that the following PVA hydrophilic layer coating composition (1) was provided on the adhesion layer 1A to be 20 ml/m². Thus, protective film 8A was wound up. Protective film 8B and 8C were prepared in the same manner as in Protective films 1B and 1C, respectively, except that the following PVA hydrophilic layer coating composition (1) was provided on the adhesion layers 1B and 1C to be 20 ml/m² before being wound up. Thereafter, protective films 8B and 8C were wound up, respectively.

<<PVA hydrophilic layer coating composition (1)>>

| Polyvinyl alcohol (average polymerization degree: 1500 or more, saponification degree: 99.5 mol %) | 0.5 parts by weight |
| Saponin | 0.03 parts by weight |
| Water | 50 parts by weight |
| Methanol | 50 parts by weight |

(Protective films 9C, 10C and 11C for a polarizing plate)

Protective films 9C, 10C and 11C were prepared in the same manner as in Protective films 2C, 3C and 4C, respectively, except that the PVA hydrophilic layer coating composition (1) was provided on the adhesion layers 2C, 3C and 4C to be 20 ml/m² before the UV irradiation to obtain PVA hydrophilic layers 2C, 3C and 4C, respectively and then the coated UV ray hardenable composition was UV irradiated to obtain hardened layers 9C, 10C and 11C in the same manner as in Protective films 2C, 3C and 4C, respectively. Thereafter, protective films 9C, 10C and 11C were wound up, respectively.

(Protective film 12C for a polarizing plate)

Protective film 12C was prepared in the same manner as in Protective film 1C, except that the following anti-static coating composition (7) was used to obtain anti-static layer 12C and adhesion layer 12C, instead of anti-static coating composition (1).

<<Anti-static coating composition (7)>>

| IP-1 | 0.5 parts by weight |
| Water | 1 part by weight |
| Diethylene glycol | 2 parts by weight |
| Methanol | 52 parts by weight |
| Acetone | 45 parts by weight |

(Protective film 13A for a polarizing plate)

Protective film 13A was prepared in the same manner as in Protective film 4A, except that the following anti-static coating composition (8) was used to obtain adhesion layer 13A, instead of anti-static coating composition (4).

<<Anti-static coating composition (8)>>

| HP-2 | 0.5 parts by weight |
| DAC 5% solution | 10 parts by weight |
| Diethylene glycol | 2 parts by weight |
| Methanol | 52 parts by weight |
| Acetone | 35 parts by weight |
| Water | 1 part by weight |

(Protective film 14C for a polarizing plate)

Protective film 14C was prepared in the same manner as in Protective film 4C, except that the following anti-static coating composition (9) was used to obtain adhesion layer 14C, instead of anti-static coating composition (4).

<<Anti-static coating composition (9)>>

| HP-1 | 0.5 parts by weight |
| DAC 5% solution | 10 parts by weight |
| Water | 1 part by weight |
| Diethylene glycol | 2 parts by weight |
| Methanol | 52 parts by weight |
| Acetone | 35 parts by weight |

(Protective film 15B for a polarizing plate)

Protective film 15B was prepared in the same manner as in Protective film 1B, except that the following anti-static coating composition (10) was used to obtain adhesion layer 15B, instead of anti-static coating composition (1).

<<Anti-static coating composition (10)>>

| HP-3 | 0.5 parts by weight |
| DAC 5% solution | 10 parts by weight |
| Water | 1 part by weight |
| Diethylene glycol | 2 parts by weight |
| Methanol | 52 parts by weight |
| Acetone | 35 parts by weight |

(Protective film 16C for a polarizing plate)

Protective film 16C was prepared in the same manner as in Protective film 1C, except that the following anti-static coating composition (11) was used to obtain adhesion layer 16C, instead of anti-static coating composition (1).

<<Anti-static coating composition (11)>>

| K-1 | 0.5 parts by weight |
| DAC 5% solution | 10 parts by weight |
| Methanol | 55 parts by weight |
| Acetone | 35 parts by weight |

(Protective film 17C for a polarizing plate)

Protective film 17C was prepared in the same manner as in Protective film 12C, except that the PVA hydrophilic layer coating solution (1) was coated on adhesive layer 12C and dried to obtain a PVA hydrophilic layer 17C.

(Protective film 18C for a polarizing plate)

Protective film 18C was prepared in the same manner as in Protective film 14C, except that the PVA hydrophilic layer coating solution (1) was coated on adhesive layer 14C and dried to obtain a PVA hydrophilic layer 18C.

(Protective film 19B for a polarizing plate)

Protective film 19B was prepared in the same manner as in Protective film 15B, except that the PVA hydrophilic layer coating solution (1) was coated on adhesive layer 15B and dried to obtain a PVA hydrophilic layer 19B.

(Protective films 20A and 21A for a polarizing plate)

The anti-static coating composition (8) was coated on one side of a 80 μm μthick TAC film (Konicatac 80UV-L produced by Konica Corp.) in the same manner as in protective film 13A, dried at 90° C. for 10 minutes to form an anti-static layer (20A) and wound up. Thereafter, while the resulting film was unwound, the UV ray hardenable resin coating composition (3) was coated on the anti-static layer (20A), dried and UV irradiated in the same manner as in protective film 4A to obtain a hardened layer 20A and wound up. Thus, protective films 20A was obtained.

The other surface of the TAC film was subjected to saponification treatment using a 60° C., 8 weight % sodium hydroxide solution, washed with water and dried to obtain a hydrophilic layer. The PVA hydrophilic layer coating composition (1) of protective film 8A was coated on the hydrophilic layer, dried to obtain a PVA hydrophilic layer 21A and wound up. Thus, protective films 21A was obtained. PVA hydrophilic %, in for 4 seconds to light of a 60 W/cm²

Preparation of polarizing film

A 120 μm thick polyvinyl alcohol film was immersed in the following dye solution for 2 minutes and longitudinally stretched by a factor of 4 at 50° C. to obtain a polarizing film.

| Dye solution | |
|---|---|
| Iodine | 1 part by weight |
| Potassium iodide | 2 parts by weight |
| Boric acid | 4 parts by weight |
| water | 93 parts by weight |

<<Preparation of polarizing plate>>
<<Preparation method-1>>

The above obtained polarizing film was immersed for 2 seconds in 30° C. water (containing a surfactant) as an adhesion auxiliary and squeezed with a squeezing roller to remove excessive water. Thereafter, protective films were superposed on both surfaces of the resulting film so that the surfaces contact the adhesive layer or PVA hydrophilic layer of the protective films, passed through two pressure rollers at a pressure of 3 kg/cm² and transported drying for 3 minutes in a 100° C. air bath. Thus, polarizing plate was prepared.

<<Preparation method-2>>

A polarizing plate was prepared in the same manner as in Preparation method-1, except that the following PVA solution was used as an adhesion auxiliary instead of water.

Adhesion auxiliary (PVA solution)

| | |
|---|---|
| Polyvinyl alcohol (viscosity average molecular weight: 1500 or more, saponification degree: 99.5 mol %) | 2 parts by weight |
| Surfactant | 0.5 parts by weight |
| Water | 98 parts by weight |

(Preparation of polarizing plates 1A, 1B and 1C)

Polarizing plates 1A, 1B and 1C were prepared using protective films 1A, 1B and 1C according to Preparation method-1.

(Preparation of polarizing plates 2C, 3C and 4C)

Polarizing plates 2C, 3C and 4C were prepared using protective films 2C, 3C and 4C according to Preparation method-1.

(Preparation of polarizing plates 5A, 5B and 5C)

Polarizing plates 5A, 5B and 5C were prepared using protective films 1A, 1B and 1C according to Preparation method-2.

(Preparation of polarizing plates 6C, 7C and 8C)

Polarizing plates 6C, 7C and 8C were prepared using protective films 2C, 3C and 4C according to Preparation method-2.

(Preparation of polarizing plates 9A, 9B and 9C)

Polarizing plates 9A, 9B and 9C were prepared using protective films 8A, 8B and 8C according to Preparation method-1.

(Preparation of polarizing plates 10C, 11C and 12C)

Polarizing plates 10C, 11C and 12C were prepared using protective films 9C, 10C and 11C according to Preparation method-1.

(Preparation of polarizing plates 13A, 13B and 13C)

Polarizing plates 13A, 13B and 13C were prepared using protective films 8A, 8B and 8C according to Preparation method-2.

(Preparation of polarizing plates 14C, 15C and 16C)

Polarizing plates 14C, 15C and 16C were prepared using protective films 9C, 10C and 11C according to Preparation method-2.

(Preparation of polarizing plates 17C, 18A, 19C, 20C, 21B, 27A and 28A)

Polarizing plates 17C, 18A, 19C, 20C, 21B, 27A and 28A were prepared using protective films 12C, 13A, 17C, 18C, 19B, 20A and 21A, respectively, according to Preparation method-1.

(Preparation of polarizing plates 22C, 23A, 24C, 25C, 26B, 29A and 30A)

Polarizing plates 22C, 23A, 24C, 25C, 26B, 29A and 30A were prepared using protective films 12C, 13A, 17C, 18C, 19B, 20A and 21A, respectively, according to Preparation method-2.

The above protective films and polarizing plates are collectively shown in Table 1.

TABLE 1

| Protective film No. | | Plastic film | Anti-static layer | | UV ray hardenable resin | Adhesion layer | PVA hydrophilic layer | Remarks |
|---|---|---|---|---|---|---|---|---|
| No. | Coating | | Anti-static agent | Binder | | | | |
| 1 | A | TAC | IP-1 | DAC | TF-232 | (1) | — | Inv. |
| 1 | B | TAC | IP-1 | DAC | TF-232 | (1) | — | Inv. |
| 1 | C | TAC | IP-1 | DAC | TF-232 | (1) | — | Inv. |
| 2 | A | TAC | IP-13 | — | EXG | (2) | — | Inv. |
| 2 | B | TAC | IP-13 | — | EXG | (2) | — | Inv. |
| 2 | C | TAC | IP-13 | — | EXG | (2) | — | Inv. |
| 3 | A | TAC | IP-16 | — | EXG | (2) | — | Inv. |
| 3 | B | TAC | IP-16 | — | EXG | (2) | — | Inv. |
| 3 | C | TAC | IP-16 | — | EXG | (2) | — | Inv. |
| 4 | A | TAC | IP-19 | — | KR-566 | (2) | — | Inv. |
| 4 | B | TAC | IP-19 | — | KR-566 | (2) | — | Inv. |
| 4 | C | TAC | IP-19 | — | KR-566 | (2) | — | Inv. |
| 5 | A | PC | IP-1 | DAC | TF-232 | (1) | — | Inv. |
| 5 | B | PC | IP-1 | DAC | TF-232 | (1) | — | Inv. |
| 5 | C | PC | IP-1 | DAC | TF-232 | (1) | — | Inv. |
| 6 | C | TAC | IP-14 | — | KR-566 | (2) | — | Inv. |
| 7 | C | TAC | IP-10 | DAC | KR-566 | (2) | — | Inv. |
| 8 | A | TAC | IP-1 | DAC | TF-232 | (1) | (1) | Inv. |
| 8 | B | TAC | IP-1 | DAC | TF-232 | (1) | (1) | Inv. |

TABLE 1-continued

| Protective film No. No. | Plastic Coating film | Anti-static layer Anti-static agent | Binder | UV ray hardenable resin | PVA Adhesion layer | hydrophilic layer | Remarks |
|---|---|---|---|---|---|---|---|
| 8  | C | TAC | IP-1  | DAC | TF-232 | (1) | (1) | Inv. |
| 9  | C | TAC | IP-13 | —   | EXG    | (2) | (1) | Inv. |
| 10 | C | TAC | IP-16 | —   | EXG    | (2) | (1) | Inv. |
| 11 | C | TAC | IP-19 | —   | KR-566 | (2) | (1) | Inv. |
| 12 | C | TAC | IP-1  | —   | EXG    | (1) | —   | Comp. |
| 13 | A | TAC | HP-2  | DAC | KR-566 | (2) | —   | Comp. |
| 14 | C | TAC | HP-1  | DAC | EXG    | (2) | —   | Comp. |
| 15 | B | TAC | HP-3  | DAC | TF-232 | (1) | —   | Comp. |
| 16 | C | TAC | K-1   | DAC | TF-232 | (1) | —   | Comp. |
| 17 | C | TAC | IP-1  | —   | TF-232 | (1) | (1) | Comp. |
| 18 | C | TAC | HP-1  | DAC | KR-566 | (2) | (1) | Comp. |
| 19 | B | TAC | HP-3  | DAC | TF-232 | (1) | (1) | Comp. |
| 20 | A | TAC | HP-2  | DAC | KR-566 | Saponification | — | Comp. |
| 21 | A | TAC | HP-2  | DAC | KR-566 | Saponification | (1) | Comp. |

Inv.: Invention
Comp.: Comparative

TABLE 2

| Polarizing plate No. No. | Plastic Coating | Anti-static layer Anti-static agent | Binder | UV ray hardenable resin | PVA Adhesion layer | hydrophilic layer | Adhesion auxiliary | Protective film No. | Remarks |
|---|---|---|---|---|---|---|---|---|---|
| 1  | A | TAC | IP-1  | DAC | TF-232 | (1) | — | 1 | 1A  | Inv. |
| 1  | B | TAC | IP-1  | DAC | TF-232 | (1) | — | 1 | 2B  | Inv. |
| 1  | C | TAC | IP-1  | DAC | TF-232 | (1) | — | 1 | 1C  | Inv. |
| 2  | C | TAC | IP-13 | —   | EXG    | (2) | — | 1 | 2C  | Inv. |
| 3  | C | TAC | IP-16 | —   | EXG    | (2) | — | 1 | 3C  | Inv. |
| 4  | C | TAC | IP-19 | —   | KR-566 | (2) | — | 1 | 4C  | Inv. |
| 5  | A | PC  | IP-1  | DAC | TF-232 | (1) | — | 2 | 1A  | Inv. |
| 5  | B | PC  | IP-1  | DAC | TF-232 | (1) | — | 2 | 1B  | Inv. |
| 5  | C | PC  | IP-1  | DAC | TF-232 | (1) | — | 2 | 1C  | Inv. |
| 6  | C | TAC | IP-13 | —   | EXG    | (2) | — | 2 | 2C  | Inv. |
| 7  | C | TAC | IP-16 | —   | EXG    | (2) | — | 2 | 3C  | Inv. |
| 8  | C | TAC | IP-19 | —   | KR-566 | (2) | — | 2 | 4C  | Inv. |
| 9  | A | TAC | IP-1  | DAC | TF-232 | (1) | (1) | 1 | 8A  | Inv. |
| 9  | B | TAC | IP-1  | DAC | TF-232 | (1) | (1) | 1 | 8B  | Inv. |
| 9  | C | TAC | IP-1  | DAC | TF-232 | (1) | (1) | 1 | 8C  | Inv. |
| 10 | C | TAC | IP-13 | —   | EXG    | (2) | (1) | 1 | 9C  | Inv. |
| 11 | C | TAC | IP-16 | —   | EXG    | (2) | (1) | 1 | 10C | Inv. |
| 12 | C | TAC | IP-19 | —   | KR-566 | (2) | (1) | 1 | 11C | Inv. |
| 13 | A | TAC | IP-1  | DAC | TF-232 | (1) | (1) | 2 | 8A  | Inv. |
| 13 | B | TAC | IP-1  | DAC | TF-232 | (1) | (1) | 2 | 8B  | Inv. |
| 13 | C | TAC | IP-1  | DAC | TF-232 | (1) | (1) | 2 | 8C  | Inv. |
| 14 | C | TAC | IP-13 | —   | EXG    | (2) | (1) | 2 | 9C  | Inv. |
| 15 | C | TAC | IP-16 | —   | EXG    | (2) | (1) | 2 | 10C | Inv. |
| 16 | C | TAC | IP-19 | —   | KR-566 | (2) | (1) | 2 | 11C | Inv. |
| 17 | C | TAC | IP-1  | —   | TF-232 | (1) | — | 1 | 12C | Comp. |
| 18 | A | TAC | HP-2  | DAC | KR-566 | (2) | — | 1 | 13A | Comp. |
| 19 | C | TAC | IP-1  | —   | TF-232 | (1) | (1) | 1 | 17C | Comp. |
| 20 | C | TAC | HP-1  | DAC | KR-566 | (2) | (1) | 1 | 18C | Comp. |
| 21 | B | TAC | HP-3  | DAC | TF-232 | (1) | (1) | 1 | 19B | Comp. |
| 22 | C | TAC | IP-1  | —   | TF-232 | (1) | — | 2 | 12C | Comp. |
| 23 | A | TAC | HP-2  | DAC | KR-566 | (2) | — | 2 | 13A | Comp. |
| 24 | C | TAC | IP-1  | —   | TF-232 | (1) | (1) | 2 | 17C | Comp. |
| 25 | C | TAC | HP-1  | DAC | KR-566 | (2) | (1) | 2 | 18C | Comp. |
| 26 | B | TAC | HP-3  | DAC | TF-232 | (1) | (1) | 2 | 19B | Comp. |
| 27 | A | TAC | HP-2  | DAC | KR-566 | Saponification | — | 1 | 20A | Comp. |
| 28 | A | TAC | HP-2  | DAC | KR-566 | Saponification | (1) | 1 | 21A | Comp. |
| 29 | A | TAC | HP-2  | DAC | KR-566 | Saponification | — | 2 | 20A | Comp. |
| 30 | A | TAC | HP-2  | DAC | KR-566 | Saponification | (1) | 2 | 21A | Comp. |

Inv.: Invention
Comp.: Comparative (Evaluation method)

The evaluation methods were as follows:

<<Anti-static property>>

(1) The protective film sample was stored at 23° C. and 30% RH for 6 hours, and the hardened layer surface specific resistance was measured at 23° C. and 30% RH by an electric resistance meter VE-30 produced by Kawaguchi Denki Co., Ltd. of (2) Specific resistance after high temperature and high humidity conditioning The protective film sample was stored at 80° C. and 80% RH for 6 hours and then at 23° C. and 30% RH for 24 hours. The resulting hardened layer surface specific resistance was measured in the same manner as in (1) above.

(3) The polarizing plate sample was cut into 30 cm×25 cm at a dust free room. Ten plates of each sample were put on a viewing box and the number of foreign matters present on the plate was counted.

<<Scratch resistance>>

(1) Pencil hardness: Pencil hardness was measured applying a 100 g load according to JIS (Japanese Industry Standard) K5401.

(2) Steel wool hardness: The surface of the sample film was rubbed reciprocally 5 times with steel wool (#0000) at an applying load of 100 g and evaluated according to the following criteria:

(Evaluation criteria)

A: No scratches
B: 1 to 5 line scratches
C: 6 to 10 line scratches
D: 11 or 30 line scratches
E: 31 or more line scratches <<Adhesion test>>

(1) Adhesion test of hardened layer

The surface of the hardened layer was scratched at an angle of 90° with a single-edged blade at a depth to the film surface and 30 mm distant from one another. Then, a commercially available cellophane tape was adhered to the cut with its one edge unadhered, and strongly pressed on a curved plastic or metal plate. Thereafter, the unadhered tape edge was sharply peeled in the horizontal direction and the ratio of the peeled hardened layer area to the tape adhered area was evaluated.

A: No peeling of the hardened layer
B: The ratio was 10% or less.
C: The ratio was 10 to 30%.
D: The ratio was above 30%.

(2) Adhesion test after high temperature and humidity treatment of hardened layer The protective film samples were stored at 80° C. and 95% RH for 500 hours, then allowed to stand at 23° C. and 55% RH for 24 hours, and evaluated for adhesion in the same manner as in above.

(3) Adhesion test after high temperature of polarizing plate

The above obtained polarizing plate was cut into a 6 cm×8 cm size. An acryl adhesive was provided on the center of the resulting specimen and temporarily adhered to a glass plate. The resulting samples were perpendicularly fixed in an oven at 80° C. and 20% RH for 1,000 hours, allowed to stand at 23° C. and 55% RH for 24 hours, and the degree of separation between the protective film and the polarizing film was visually evaluated according to the following criteria:

A: No separation occurred.
B: The separation occurred at not more than 1 mm distant from the edges of the plate.
C: The separation occurred at not more than 2 mm distant from the edges of the plate.
D: The separation occurred at 3 to 5 mm distant from the edges of the plate.
E: The separation occurred at not less than 6 mm distant from the edges of the plate.

(4) Adhesion test after high temperature and humidity of polarizing plate

The above obtained polarizing plate was cut into a 6 cm×8 cm size. An acryl adhesive was provided on the center of the resulting specimen and temporarily adhered to a glass plate. The resulting samples were perpendicularly fixed in an oven at 80° C. and 95% RH for 1,000 hours, allowed to stand at 23° C. and 55% RH for 24 hours, and the degree of separation was visually evaluated in the same manner as in (3).

<<Coatability>>

Coatability was evaluated as follows:

The lighting fluorescent lamp was reflected on the anti-static layer and hardenable layer of the protective film and the reflected lamp tube shape was evaluated according to the following evaluation criteria.

A: The tube image is completely straight.
B: The tube image is slightly curved.
C: The tube image is curved.
D: The tube image is wavy.
E: The tube image is spotted.

<<Yield>>

Coatability was evaluated as follows:

The area ratio of the protective film or polarizing plate which can be practicable to the resulting protective film or polarizing plate each having a 1500 m×1.3 m size was represented by percentage. In the protective film or polarizing plate which can be practicable, loss of the portions in which adhesive tape is used, coating defects or dust adhering was subtracted from the originally produced film.

Example 1

The protective films as shown in Table 3 were evaluated for anti-static property, scratching resistance and adhesion property. The results are shown in Table 3.

TABLE 3

| Protective film No. | Anti-static property Surface specific resistance (Ω/cm) | | Scratching resistance | | Adhesion property | | |
|---|---|---|---|---|---|---|---|
| | (1) | (2) | (1) | (2) | (1) | (2) | |
| 1A | $8 \times 10^9$ | $1 \times 10^{10}$ | 6H | A | B | B | Inv. |
| 2A | $3 \times 10^9$ | $5 \times 10^9$ | 6H | A | B | B | Inv. |
| 3A | $2 \times 10^9$ | $4 \times 10^9$ | 6H | A | B | B | Inv. |
| 4A | $1 \times 10^9$ | $2 \times 10^9$ | 6H | A | B | B | Inv. |
| 5A | $8 \times 10^9$ | $1 \times 10^{10}$ | 6H | A | B | B | Inv. |
| 12C | $2 \times 10^{12}$ | $6 \times 10^{12}$ | 3H | A | C | D | Comp. |
| 13C | $1 \times 10^{12}$ | $3 \times 10^{12}$ | 4H | A | D | D | Comp. |
| 14C | $1 \times 10^{13}$ | $5 \times 10^{13}$ | 4H | A | C | D | Comp. |
| 15B | $3 \times 10^{12}$ | $8 \times 10^{12}$ | 3H | A | D | D | Comp. |
| 16C | $5 \times 10^{13}$ | $>10^{14}$ | 5H | A | D | D | Comp. |

As is apparent from Table 3, inventive samples are superior in anti-static property and adhesion property to comparative samples.

Example 2

The discontinuous coating, continuous coating and in-line coating in the manufacturing process of protective films were compared. The results are shown in Table 4.

TABLE 4

| Protective film No. | Yield (%) | Coatability | Adhesion property (1) | Adhesion property (2) | Remarks |
|---|---|---|---|---|---|
| 1A | 93 | B | B | B | Inv. |
| 1B | 96 | A-B | A | B | Inv. |
| 1C | 99 | A | A | A | Inv. |
| 2A | 94 | B | B | B | Inv. |
| 2B | 97 | A | A | B | Inv. |
| 2C | 99 | A | A | A | Inv. |
| 3A | 93 | B | B | B | Inv. |
| 3B | 97 | A | A | B | Inv. |
| 3C | 99 | A | A | A | Inv. |
| 4A | 94 | B | B | B | Inv. |
| 4B | 97 | A-B | A | B | Inv. |
| 4C | 99 | A | A | A | Inv. |
| 5A | 93 | B | B | B | Inv. |
| 5B | 96 | A-B | A | B | Inv. |
| 5C | 99 | A | A | A | Inv. |
| 12C | 88 | C | C | D | Comp. |
| 13A | 83 | C | C | D | Comp. |
| 14C | 81 | D | D | D | Comp. |
| 15B | 82 | D | D | D | Comp. |
| 16C | 77 | C | D | D | Comp. |

As is apparent from Table 4, inventive samples provide excellent yield, coatability and adhesion property in which in-line coating, continuous coating and discontinuous coating, are excellent in that order. In contrast, comparative samples are extremely inferior in coatability to the inventive samples, and when a comparative anti-static agent is used, comparative samples are inferior in yield and adhesion property even in in-line coating to the inventive samples.

Example 3

The polarizing plates as shown in Table 5 were evaluated for yield, adhesion property and anti-static property. The anti-static property was evaluated according to anti-static property evaluation method (3), and the number of stainings adhered to the polarizing plate was counted. The adhesion property and yield were evaluated. The results are shown in Table 5.

TABLE 5

| Polarizing plate No. | Yield (%) | Adhesion property (3) | Adhesion property (4) | Anti-static property (number of stainings) | Protective film No. | Remarks |
|---|---|---|---|---|---|---|
| 1A | 89 | A | B | 1 | 1A | Inv. |
| 1B | 92 | A | B | 0 | 1B | Inv. |
| 1C | 95 | A | B | 0 | 1C | Inv. |
| 2C | 95 | A | B | 0 | 2C | Inv. |
| 3C | 95 | A | B | 0 | 3C | Inv. |
| 4C | 95 | A | B | 0 | 4C | Inv. |
| 5A | 89 | A | A' | 1 | 1A | Inv. |
| 5B | 92 | A | A | 0 | 1B | Inv. |
| 5C | 96 | A | A | 0 | 1C | Inv. |
| 6C | 95 | A | A | 0 | 2C | Inv. |
| 7C | 95 | A | A | 0 | 3C | Inv. |
| 8C | 96 | A | A | 0 | 4C | Inv. |
| 9A | 88 | A | A | 1 | 8A | Inv. |
| 9B | 92 | A | A | 0 | 8B | Inv. |
| 9C | 95 | A | A | 0 | 8C | Inv. |
| 10C | 96 | A | A | 0 | 9C | Inv. |
| 11C | 95 | A | A | 0 | 10C | Inv. |
| 12C | 95 | A | A | 0 | 11C | Inv. |
| 13A | 90 | A | A | 0 | 8A | Inv. |
| 13B | 92 | A | A | 0 | 8B | Inv. |
| 13C | 95 | A | A | 0 | 8C | Inv. |

TABLE 5-continued

| Polarizing plate No. | Yield (%) | Adhesion property (3) | Adhesion property (4) | Anti-static property (number of stainings) | Protective film No. | Remarks |
|---|---|---|---|---|---|---|
| 14C | 95 | A | A | 0 | 9C | Inv. |
| 15C | 95 | A | A | 0 | 10C | Inv. |
| 16C | 95 | A | A | 0 | 11C | Inv. |
| 17C | 82 | A | B | 3 | 12C | Comp. |
| 18A | 76 | A | B | 10 | 13A | Comp. |
| 19C | 82 | A | A | 3 | 17C | Comp. |
| 20C | 73 | A | A | 13 | 18C | Comp. |
| 21B | 82 | A | A | 10 | 19B | Comp. |
| 22C | 83 | A | A' | 3 | 12C | Comp. |
| 23A | 75 | A | A' | 10 | 13A | Comp. |
| 24C | 83 | A | A | 3 | 17C | Comp. |
| 25C | 74 | A | A | 12 | 18C | Comp. |
| 26B | 81 | A | A | 11 | 19B | Comp. |
| 27A | 71 | C | C | 3 | 20A | Comp., Saponification |
| 28A | 70 | B' | C | 4 | 20A | Comp., Saponification |
| 29A | 70 | C | C | 3 | 21A | Comp., Saponification |
| 30A | 69 | B | C | 4 | 21A | Comp., Saponification |

Note:
A' and B' are intermediate between A and B and intermediate between B and C, respectively.

Regarding adhesion between the polarizing film and the protective film, all samples were generally good, although the polarizing plates 27A, 28A, 29A and 30A, which had saponificated supports, were slightly inferior. Regarding anti-static property, samples prepared by continuously coating or in-line coating had no foreign matter attraction and samples prepared by discontinuously coating had slight foreign matter attraction. The samples using comparative anti-static agents had attracted considerable foreign matters even in in-line coating. Regarding product yield, the samples obtained by discontinuous coating resulted in poor yield. The saponification treatment resulted in poor yield due to a film cutting. The samples obtained by continuous coating or in-line coating provided good yield, and the samples obtained by in-line coating provided particularly good yield. However, the samples obtained using comparative anti-static agents outside the scope of the invention had attracted considerable foreign matters even in in-line coating, and resulted in poor yield.

What is claimed is:

1. A protective film of a polarizing plate, the protective film comprising a support, and provided on one side of the support, an anti-static layer and a hardened layer in that order, the hardened layer being obtained by hardening a layer containing an ultraviolet ray hardenable resin composition with ultraviolet irradiation, wherein the antistatic layer contains a compound having a chemical structure represented by formula (I), (II), (III), (IV), (V), (1), (2), or (3):

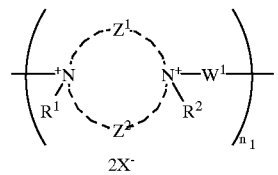

formula (I)

wherein $Z^1$ and $Z^2$ independently represent an alkylene group having 1 to 7 carbon atoms or an alkenylene group; $R^1$ and $R^2$ independently represent an alkyl group having 1 to 10 carbon atoms, an alkenyl group, an aralkyl group or an aryl group, provided that $R^1$ and $R^2$ may combine with each other to form a ring; $W^1$ represents a divalent group; X represents an anion; and $n_1$ represents an integer of 1 to 100, formula (II)

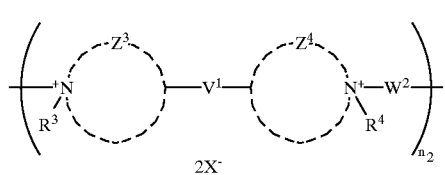

wherein $Z^3$ and $Z^4$ independently represent an atomic group necessary to form a heterocyclic ring having 3 to 10 carbon atoms; $R^3$ and $R^4$ independently represent an alkyl group having 1 to 10 carbon atoms, an alkenyl group, an aralkyl group or an aryl group; provided that, when $Z^3$ forms an aromatic ring, $R^3$ is absent and when $Z^4$ forms an aromatic ring, $R^4$ is absent; $V^1$ represents a single bond or an alkylene, alkenylene or aralkylene group; $W^2$ represents an alkylene group having 1 to 10 carbon atoms, an alkenylene group or an aralkylene group; X represents an anion; and $n_2$ represents an integer of 1 to 100, formula (III)

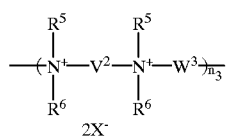

wherein $R^5$ and $R^6$ independently represent an alkyl group having 1 to 10 carbon atoms, a cycloalkyl group, a hydroxyalkyl group, an alkenyl group, an aralkyl group or an aryl group; $V^2$ represents an alkylene, alkenylene or aralkylene group; $W^3$ represents an alkylene group having 1 to 10 carbon atoms, an alkenylene group or an aralkylene group; X represents an anion; and $n_3$ represents an integer of 1 to 100, formula (IV)

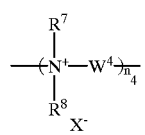

wherein $R^7$ and $R^8$ independently represent an alkyl group having 1 to 10 carbon atoms, an alkenyl group, an aralkyl group or an aryl group; $W^4$ represents an alkylene group having 1 to 10 carbon atoms, an alkenylene group or an aralkylene group; X represents an anion; and $n_4$ represents an integer of 1 to 100, formula (V)

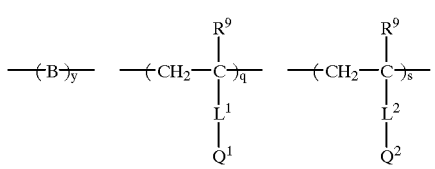

wherein B represents a copolymer monomer unit; $R^9$ represents a hydrogen atom or a methyl group; $L^1$ and $L^2$ independently represent a divalent linkage group; y represents 0 to 90 mol %; q represents 0 to 99 mol %; s represents 0 to 50 mol %, provided that y+s is not 100 and y+q+s is 100; $Q^1$ represents a group represented by the following formula (VI), (VII), (VIII) or (IX);

formula (VI)

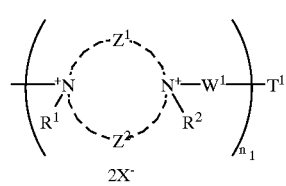

wherein $T^1$ is represented by formula (X) or (X');

formula (X)

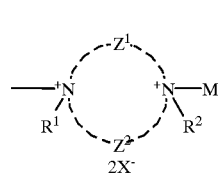

formula (X')

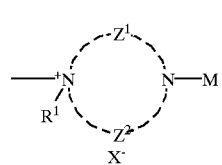

in which M represents an alkyl group having 1 to 10 carbon atoms, an alkenyl group, an aralkyl group or an aryl group, formula (VII)

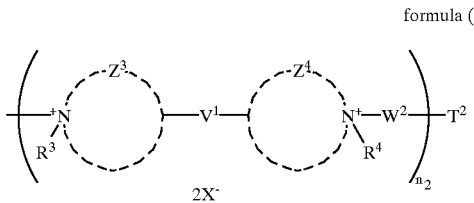

wherein $T^2$ is by formula (XI) or (XI');

formula (XI)

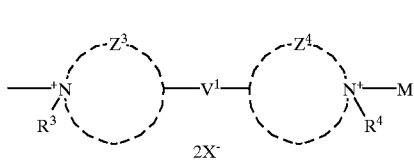

formula (XI')

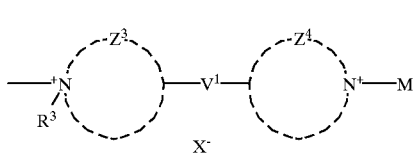

in which M represents an alkyl group having 1 to 10 carbon atoms, an alkenyl group, an aralkyl group or an aryl group, formula (VIII)

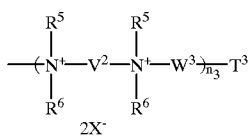

wherein $T^3$ is represented by formula (XII) or (XII');

formula (XII)

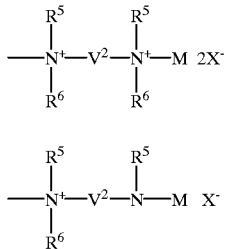

formula (XII')

in which M represents an alkyl group having 1 to 10 carbon atoms, an alkenyl group, a benzyl group or an aryl group, formula (IX)

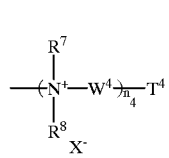

wherein $R^{16}$ and $R^{17}$ independently represent an alkyl group having 1 to 10 carbon atoms, an alkenyl group, an aralkyl group or an aryl group; $W^8$ represents an alkylene group having 1 to 10 carbon atoms, an alkenylene group or an aralkylene group; X represents an anion; $n_8$ represents an integer of 1 to 100; and $T^4$ is represented by formula (XIII) or (XIII');

formula (XIII)

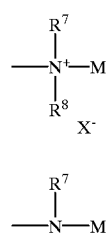

formula (XIII')

in which M represents an alkyl group having 1 to 10 carbon atoms, an alkenyl group, a benzyl group or an aryl group; and $Q^2$ represents a group represented by formula (X), (X'), (XI), (XI'), (XII), (XII'), (XIII), (XIII') represented above or by the following formula (XIV);

formula (XIV)

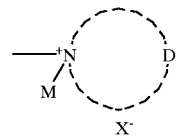

wherein D represents an atomic group necessary to form a 5- or 6-membered saturated or unsaturated heterocyclic ring having 1 to 12 carbon atoms; and M represents an alkyl group having 1 to 10 carbon atoms, an alkenyl group, an aralkyl group or an aryl group, formula (V)

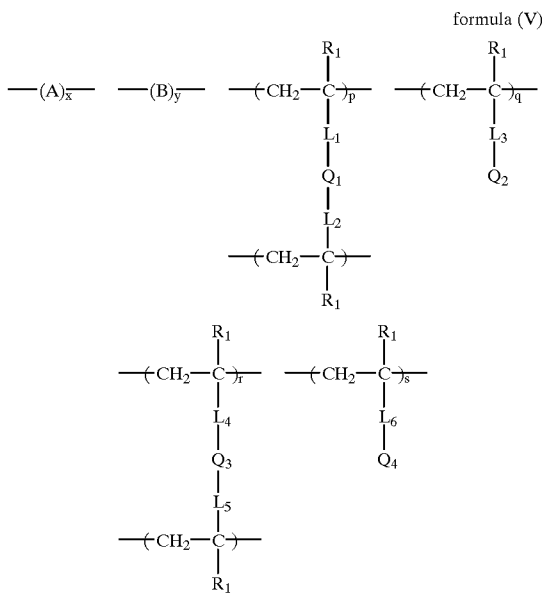

wherein A represents a copolymer monomer unit given by copolymerizing a monomer having at least two ethylenically unsaturated bonds; B represents a copolymer monomer unit given by copolymerizing a monomer having an ethylenically unsaturated bond; $R_1$ represents a hydrogen atom or a methyl group; $L_1$, $L_2$, $L_3$, $L_4$, $L_5$ and $L_6$ independently represent a divalent linkage group; x represents 0 to 80 mol %; y represents 0 to 90 mol %; p represents 0 to 100 mol %; q represents 0 to 99 mol %; r represents 0 to 100 mol %; s represents 0 to 50 mol %, provided that x+y is not 100, y+q is not 100, y+s is not 100, q+s is not 100, y+q+s is not 100 and x+y+p+q+r+s is 100; $Q_1$ and $Q_3$ represent a divalent linkage group represented by the following formula (4), (5), (6) or (7); and $Q_2$ and $Q_4$ represent a group represented by the following formula (4'), (5'), (6') or (7');

formula (4)

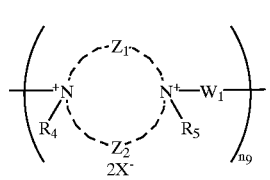

formula (4')

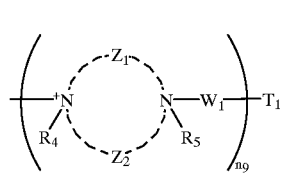

wherein $Z_1$ and $Z_2$ independently represent an alkylene group having 1 to 7 carbon atoms or an alkenylene group; $R_4$ and $R_5$ independently represent an alkyl group having 1 to 10 carbon atoms, an alkenyl group, an aralkyl group or an aryl group, provided that $R_4$ and $R_5$ may combine with each other to form a ring; $W_1$ represents an alkylene group having 1 to 10 carbon atoms, an alkenylene group or an aralkylene group; X represents an anion; $n_9$ represents an integer of 1 to 100; $T_1$ is represented by formula (8) or (8')

formula (8)

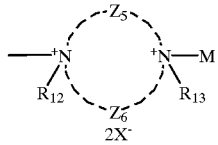

formula (8')

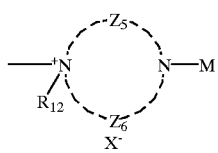

in which $Z_5$ and $Z_6$ independently represent an alkylene group having 1 to 7 carbon atoms; $R_{12}$ and $R_{13}$ independently represent an alkyl group having 1 to 10 carbon atoms, an alkenyl group, a benzyl group or an aryl group, provided that $R_{12}$ and $R_{13}$ may combine with each other to form a ring; X represents an anion; and M represents an alkyl group having 1 to 10 carbon atoms, an alkenyl group, an aralkyl group or an aryl group, formula (5)

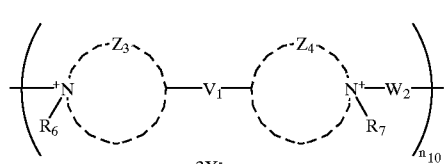

formula (5')

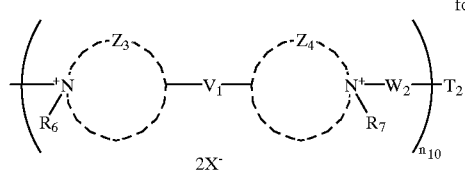

wherein $Z_3$ and $Z_4$ independently represent an atomic group necessary to form a heterocyclic ring having 3 to 10 carbon atoms; $R_6$ and $R_7$ independently represent an alkyl group having 1 to 10 carbon atoms, an alkenyl group, an aralkyl group or an aryl group; $V_1$ represents a single bond or an alkylene, alkenylene or aralkylene group; $W_2$ represents an alkylene group having 1 to 10 carbon atoms, an alkenylene group or an aralkylene group; X represents an anion; $n_{10}$ represents an integer of 1 to 100; and $T_2$ is represented by formula (9) or (9');

formula (9)

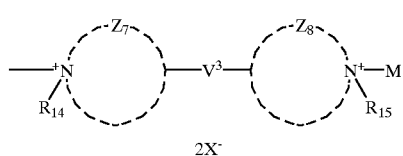

formula (9')

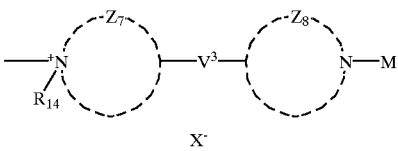

in which $R_{14}$ and $R_{15}$ independently represent an alkyl group having 1 to 10 carbon atoms, an alkenyl group, an aralkyl group or an aryl group; $V_3$ represents a single bond or an alkylene, alkenylene or aralkylene group; X represents an anion; and M represents an alkyl group having 1 to 10 carbon atoms, an alkenyl group, an aralkyl group or an aryl group, formula (6)

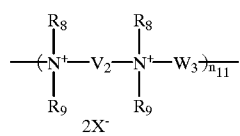

formula (6')

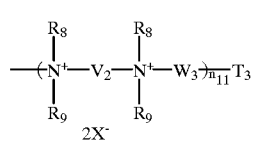

wherein $R_8$ and $R_9$ independently represent an alkyl group having 1 to 10 carbon atoms, a cycloalkyl group, a hydroxyalkyl group, an alkenyl group, an aralkyl group or an aryl group; $W_3$ represents an alkylene group having 1 to 10 carbon atoms, an alkenylene group or an aralkylene group; $V_2$ represents an alkylene, alkenylene or aralkylene group; X represents an anion; $n_{11}$ represents an integer of 1 to 100; and $T_3$ is represented by formula (10) or (10')

formula (10)

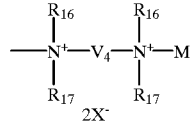

formula (10')

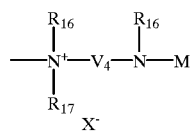

in which $R_{16}$ and $R_{17}$ independently represent an alkyl group having 1 to 10 carbon atoms, a cycloalkyl group, a hydroxyalkyl group, an alkenyl group, a benzyl group or an aryl group; $V_4$ represents an alkylene, alkenylene or aralkylene group; X represents an anion; and M represents an alkyl group having 1 to 10 carbon atoms, an alkenyl group, an aralkyl group or an aryl group, formula (7)

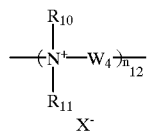

formula (7′)

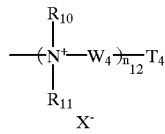

wherein $R_{10}$ and $R_{11}$ independently represent an alkyl group having 1 to 10 carbon atoms, an alkenyl group, an aralkyl group or an aryl group; $W_4$ represents an alkylene group having 1 to 10 carbon atoms, an alkenylene group or an aralkylene group; X represents an anion; $n_{12}$ represents an integer of 1 to 100; and $T_4$ is represented by formula (11) or (11′)

formula (11)

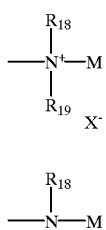

formula (11′)

in which $R_{18}$ and $R_{19}$ independently represent an alkyl group having 1 to 10 carbon atoms, an alkenyl group, an aralkyl group or an aryl group; X represents an anion; and M represents an alkyl group having 1 to 10 carbon atoms, an alkenyl group, an aralkyl group or an aryl group, formula (2)

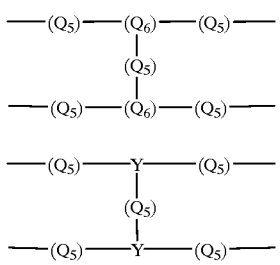

formula (3)

wherein Y represents a trivalent group; Q6 represents a trivalent group represented by the following formula:

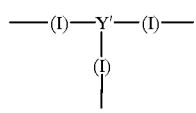

-continued

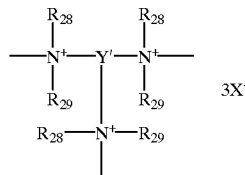

wherein Y′ represents a trivalent linkage group, $R_{28}$ and $R_{29}$ independently represent an alkyl group having 1 to 10 carbon atoms, an alkenyl group, an aralkyl group or an aryl group, and I represents a group represented by the following formula (13), (14), (15) or (16); and $Q_5$ is represented by the following formula (13), (14), (15) or (16):

formula (13)

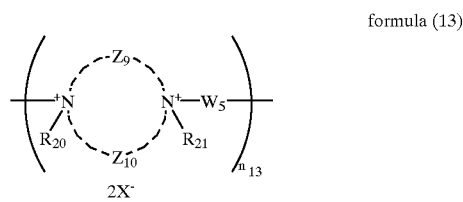

wherein $Z_9$ and $Z_{10}$ independently represent an alkylene group having 1 to 7 carbon atoms or an alkenylene group; $R_{20}$ and $R_{21}$ independently represent an alkyl group having 1 to 10 carbon atoms, an alkenyl group, an aralkyl group or an aryl group, provided that $R_{20}$ and $R_{21}$ may combine with each other to form a ring; $W_5$ represents an alkylene group having 1 to 10 carbon atoms, an alkenylene group or an aralkylene group; X represents an anion; and $n_{13}$ represents an integer of 1 to 100, formula (14)

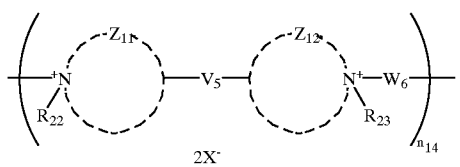

wherein $Z_{11}$ and Z independently represent an atomic group necessary to form a heterocyclic ring having 3 to 10 carbon atoms; $R_{22}$ and $R_{23}$ independently represent an alkyl group having 1 to 10 carbon atoms, an alkenyl group, an aralkyl group or an aryl group; $V_5$ represents a single bond or an alkylene, alkenylene or aralkylene group; $W_6$ represents an alkylene group having 1 to 10 carbon atoms, an alkenylene group or an aralkylene group; X represents an anion; and $n_{14}$ represents an integer of 1 to 100, formula (15)

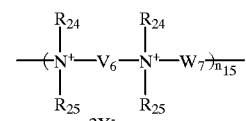

wherein $R_{24}$ and $R_{25}$ independently represent an alkyl group having 1 to 10 carbon atoms, a cycloalkyl group, a hydroxyalkyl group, an alkenyl group, an aralkyl group or an aryl group; $W_7$ represents an alkylene group having 1 to 10 carbon atoms, an alkenylene group or an aralkylene group, $V_6$ represents an alkylene, alkenylene or aralkylene group; X represents an anion; and $n_{15}$ represents an integer of 1 to 100, formula (16)

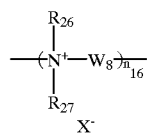

wherein $R_{26}$ and $R_{27}$ independently represent an alkyl group having 1 to 10 carbon atoms, an alkenyl group, an aralkyl group or an aryl group; $W_8$ represents an alkylene group having 1 to 10 carbon atoms, an alkenylene group or an aralkylene group; X represents an anion; and $n_{16}$ represents an integer of 1 to 100.

2. The protective film of claim , wherein $L^1$ and $L^2$ in formula (V) and $L_1, L_2, L_3, L_4, L_5$ and $L_6$ in formula (1) are selected from the group consisting of

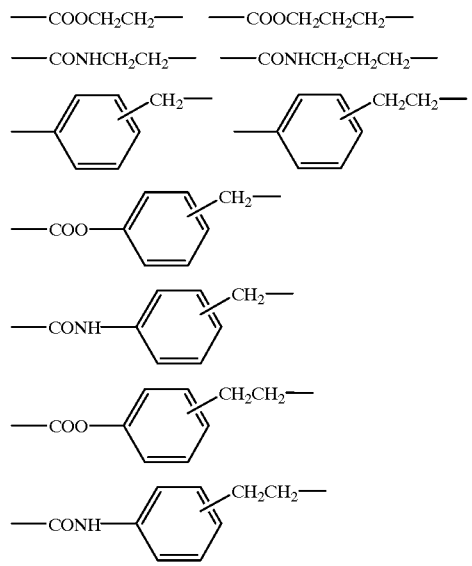

3. The protective film of claim 1, wherein the protective film has an adhesion layer containing a hydrophilic polymer on the surface of the support opposite the antistatic layer.

4. The protective film of claim 3, having a PVA hydrophilic layer on the adhesion layer.

5. A polarizing plate comprising a polarizing film and provided on one or each side of the polarizing film, a protective film comprising a support, and provided on one side of the support, an anti-static layer and a hardened layer in that order, the hardened layer being obtained by hardening a layer containing an ultraviolet ray hardenable resin composition with ultraviolet irradiation, so that the polarizing film adheres to the surface of the protective film opposite the anti-static layer, wherein the antistatic layer contains a hydrophobic binder and a compound having a chemical structure represented by formula (I), (II), (III), (IV), (V), (1), (2) or (3), each formula being defined in claim 1.

6. The protective film of claim 5, wherein $L^1$ and $L^2$ in formula (V) and $L_1, L_2, L_3, L_4, L_5$ and $L_6$ in formula (1) are selected from the group consisting of

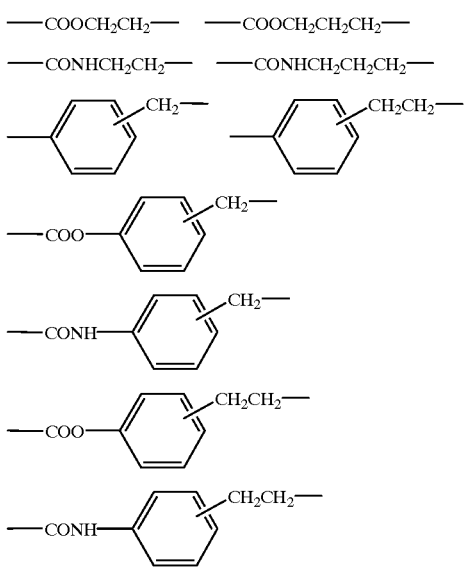

7. The polarizing plate of claim 5, wherein the protective film has an adhesion layer containing a hydrophilic polymer on the surface of the support opposite the antistatic layer.

8. The polarizing plate of claim 7, wherein the protective film has a PVA hydrophilic layer on the adhesion layer.

* * * * *